US012280618B2

(12) United States Patent
Arevalo et al.

(10) Patent No.: US 12,280,618 B2
(45) Date of Patent: Apr. 22, 2025

(54) ROTARY UNION WITH ENERGY HARVESTING STRUCTURE

(71) Applicant: Hendrickson USA, L.L.C., Schaumburg, IL (US)

(72) Inventors: Francisco Arevalo, Joliet, IL (US); Jeff R. Zawacki, Channahon, IL (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 560 days.

(21) Appl. No.: 17/579,659

(22) Filed: Jan. 20, 2022

(65) Prior Publication Data

US 2022/0234396 A1 Jul. 28, 2022

Related U.S. Application Data

(60) Provisional application No. 63/141,044, filed on Jan. 25, 2021.

(51) Int. Cl.
*B60C 23/00* (2006.01)
*H02K 7/18* (2006.01)

(52) U.S. Cl.
CPC ..... *B60C 23/00345* (2020.05); *H02K 7/1846* (2013.01); *B60C 23/00327* (2020.05)

(58) Field of Classification Search
CPC ............ B60C 23/003; B60C 23/00305; B60C 23/00309; B60C 23/00318; B60C 23/00327; B60C 23/00336; B60C 23/00345; B60C 23/00347; B60C 23/00354; B60C 23/00363; B60C 23/00372; B60C 23/00381; B60C 23/0039; H02K 7/1846
See application file for complete search history.

(56) References Cited

U.S. PATENT DOCUMENTS

| 4,536,668 | A | 8/1985 | Boyer |
|---|---|---|---|
| 4,893,877 | A | 1/1990 | Powell et al. |
| 5,505,080 | A | 4/1996 | McGhee |
| 6,046,672 | A | 4/2000 | Pearman |
| 6,742,386 | B1 | 6/2004 | Larson |
| 7,403,103 | B2 | 7/2008 | Pearman |

(Continued)

FOREIGN PATENT DOCUMENTS

| EP | 3756908 A1 | 12/2020 | |
|---|---|---|---|
| WO | 2018085791 A1 | 5/2018 | |
| WO | WO-2020198806 A1 * | 10/2020 | ......... B60B 27/0068 |

*Primary Examiner* — Kip T Kotter
(74) *Attorney, Agent, or Firm* — Dureska & Moore, LLC; David P. Dureska; David J. Danko

(57) ABSTRACT

A rotary union for a tire inflation system of a heavy-duty vehicle that includes energy harvesting structure for generating electricity to power electronic components of the heavy-duty vehicle. The energy harvesting structure is integrated with and protected by the rotary union. The energy harvesting structure includes components that are attached to respective static and rotatable components of the rotary union that generate electricity for powering the electronic components during rotational movement of the rotatable components relative to the static components during operation of the heavy-duty vehicle. The components of the energy harvesting structure can be entirely removed or separated and sealed from a flow path of pressurized air through the rotary union.

24 Claims, 12 Drawing Sheets

(56) References Cited

U.S. PATENT DOCUMENTS

| | | | |
|---|---|---|---|
| 8,505,600 B2 | 8/2013 | Padula et al. | |
| 9,132,704 B2 | 9/2015 | Wilson et al. | |
| 9,933,337 B2 | 4/2018 | White et al. | |
| 10,913,315 B1* | 2/2021 | Del Olmo | B60C 23/00354 |
| 2004/0075022 A1 | 4/2004 | MacKness | |
| 2006/0164225 A1 | 7/2006 | Pearman | |
| 2010/0289271 A1 | 11/2010 | DiMauro et al. | |
| 2011/0114404 A1 | 5/2011 | Lee | |
| 2011/0168465 A1 | 7/2011 | Starr | |
| 2011/0168466 A1 | 7/2011 | Starr | |
| 2012/0024445 A1 | 2/2012 | Wilson et al. | |
| 2012/0067654 A1 | 3/2012 | Carabelli et al. | |
| 2017/0276570 A9* | 9/2017 | White | B60B 27/0068 |
| 2018/0186197 A1* | 7/2018 | Tsiberidou | B60C 23/00318 |
| 2020/0134939 A1* | 4/2020 | Schell | G07C 5/008 |

* cited by examiner

ROTARY UNION WITH ENERGY HARVESTING STRUCTURE

CROSS-REFERENCE TO RELATED APPLICATION

This application claims the benefit of U.S. Provisional Patent Application Ser. No. 63/141,044 filed on Jan. 25, 2021

BACKGROUND

Technical Field

The disclosed subject matter relates to tire inflation systems for heavy-duty vehicles, such as tractor-trailers or semi-trailers. More particularly, the disclosed subject matter relates to a rotary union utilized in a tire inflation system for a heavy-duty vehicle. Still more particularly, the disclosed subject matter is directed to a rotary union for a heavy-duty vehicle tire inflation system that includes energy harvesting structure integrated into the rotary union for energizing electronic components associated with a wheel end of the heavy-duty vehicle, such as a wheel end sensor, thereby eliminating the need for disposable energy sources, such as batteries, and minimizing vehicle maintenance associated with such components, thus reducing vehicle downtime. The rotary union of the disclosed subject matter also eliminates the need for other energy saving strategies employed with such electronic components when disposable energy sources are utilized, such as limiting functionality of the electronic components under certain circumstances in order to maximize battery life, thus improving the overall functionality and life of the components. In addition, the energy harvesting structure is housed within and protected by the rotary union, and components within the wheel end assembly are protected from the energy harvesting structure, thereby minimizing potential damage to the energy harvesting structure of the rotary union and/or other components of the wheel end assembly if components of the energy harvesting structure become defective, as well as decreasing packaging space and overall vehicle weight, and thus decreasing the cost associated with employing energy harvesting structures in the wheel end of the heavy-duty vehicle.

The use of tire inflation systems in heavy-duty vehicles has been very popular for many years. Heavy-duty vehicles typically include trucks and tractor-trailers or semi-trailers, and trailers thereof. Reference herein is made to heavy-duty vehicles for the purpose of convenience, with the understanding that such reference includes trucks, tractor-trailers and semi-trailers, and trailers thereof. Each heavy-duty vehicle generally includes a frame, from which at least one axle is suspended. A wheel end assembly is rotatably mounted on each end of the axle. More specifically, each wheel end assembly typically includes a wheel hub rotatably mounted on a bearing assembly that in turn is immovably mounted on a respective one of each of the ends of the axle, commonly known as an axle spindle. In this manner, the bearing assemblies enable each wheel hub to rotate about a respective axle spindle. A hubcap is attached to the outboard end of the wheel hub and seals the outboard end of the wheel end assembly. One or more tires in turn are mounted on the wheel hub in a manner known in the art. All heavy-duty vehicles include multiple tires, each of which is inflated with a fluid or gas, such as air, to an optimum or recommended pressure. This optimum or recommended tire pressure typically is referred to in the art as the target inflation pressure or the target pressure.

However, it is well known that air may leak from a tire, usually in a gradual manner, but sometimes rapidly if there is a problem with the tire, such as a defect or a puncture caused by a road hazard. As a result, it is necessary to regularly check the air pressure in each tire to ensure that the tires are not significantly below the target pressure and thus under-inflated. Should an air check show that a tire is under-inflated, it is desirable to enable air to flow into the tire to return it to the target pressure. Likewise, it is well known that the air pressure in a tire may increase due to increases in ambient air temperature, so it is necessary to regularly check the air pressure in each tire to ensure that the tires are not greatly above the target pressure, and thus over-inflated. Should an air check show that a tire is over-inflated, it is desirable to enable air to flow out of the tire to return it to the target pressure.

The large number of tires on any given heavy-duty vehicle setup makes it difficult to manually check and maintain the target pressure for each and every tire. This difficulty is compounded by the fact that heavy-duty vehicles in a fleet may be located at a site for an extended period of time, during which the tire pressure might not be checked. Any one of these heavy-duty vehicles might be placed into service at a moment's notice, leading to the possibility of operation with under-inflated or over-inflated tires. Such operation may increase the chance of less-than-optimum performance and/or reduced life of a tire in service as compared to operation with tires at the target pressure, or within an optimum range of the target pressure. Moreover, should a tire encounter a condition during operation of the heavy-duty vehicle that causes the tire to become under-inflated, such as developing a leak from striking a road hazard, or over-inflated, such as increasing pressure from an increased ambient air temperature, the life and/or performance of the tire may be significantly reduced if the under-inflation or over-inflation continues unabated during continued operation of the heavy-duty vehicle. The potential for significantly reduced tire life typically increases in heavy-duty vehicles that travel for long distances and/or extended periods of time.

Such a need to maintain the target pressure in each tire, and the inconvenience to the vehicle operator to manually check and maintain a proper tire pressure that is at or near the target pressure, led to the development of tire inflation systems. Tire inflation systems attempt to automatically monitor the pressure in a vehicle tire, inflate the tire with air, and/or deflate the tire to maintain the target pressure in the tire during operation of the heavy-duty vehicle. Many of these tire inflation systems utilize rotary unions that transmit air from a pressurized axle or pneumatic line in fluid communication with an air source located on the vehicle, such as an air tank, to the rotating tires. The rotary union provides an interface between static components and the rotating wheel components. As a result, a rotary union typically is mounted in or near the outboard end of an axle spindle, and is in fluid communication with one or more outgoing pneumatic lines which pneumatically connect to a respective tire proximate the axle spindle. The rotary union in turn is in fluid communication with an air source located on the heavy-duty vehicle via a pneumatic line that is connected to and extends inboardly from the rotary union into the axle spindle and is connected to the air source.

One such rotary union is mounted on the interior of the hubcap attached to the outboard end of a wheel hub rotatably mounted on the axle spindle of the axle. Such rotary unions typically include a housing for mounting the rotary union to the hubcap and a stem with an inboard portion and an outboard portion. The inboard portion of the rotary union stem threadably engages a female hose connector of a pneumatic conduit or line of the tire inflation system extending through the axle. The outboard portion of the rotary union stem includes one or more bearings press-fit onto the outboard portion of the stem. The bearings in turn are press-fit into the housing, which is attached to an intermediate wall of the hubcap via suitable fasteners, such as bolts. The housing rotates about the outboard portion of the rotary union stem as the hubcap rotates during operation of the heavy-duty vehicle via the bearings. The outboard portion of the rotary union stem, which remains static, in turn is in fluid communication with a tire hose connected to the hubcap via pneumatic conduit means integrated/attached to the hubcap.

Electronic components are often employed with the wheel ends of heavy-duty vehicles, including components of the wheel end assemblies. For example, wheel end sensors attached to or incorporated into the wheel end assemblies of heavy-duty vehicles, such as a hubcap, are often utilized to sense and monitor conditions of the wheel end assembly to determine if issues with any of the wheel end assembly components have arisen, including components of a tire inflation system. For example, such wheel end sensors have been employed to monitor the temperature of the wheel end assembly, as a consistently high temperature may indicate a lack of lubricant or improper functioning of the bearing assembly. Such wheel end sensors have also been employed to monitor the vibration experienced in the wheel end assembly, as a consistently high level of vibration may also indicate improper functioning of the bearing assembly. In addition, such wheel end sensors have been employed to monitor humidity in the wheel end assembly, which may indicate excess moisture that may damage components, wheel speed and direction, and/or the revolution count of the wheel hub, which may be used to calculate the distance that the vehicle has traveled, based on tire size. Moreover, such wheel end sensors have been employed to monitor pressure within the tire(s) of the heavy-duty vehicle.

When electronic components, such as wheel end sensors, are employed with wheel end assemblies, they often utilize a disposable power source, such as batteries, to energize the electronic components. While generally suitable for their intended use, such disposable power sources eventually need replaced, which typically requires removal of the wheel end sensor from the wheel end, resulting in increased vehicle maintenance and downtime. In addition, in certain wheel end assembly configurations in which the wheel end sensor is disposed in the hubcap, removal of the sensor from the hubcap may expose the interior of the hubcap, potentially resulting in the entry of contaminants into the hubcap or escape of lubricant from the hubcap, and thus the wheel end assembly. Moreover, energy saving strategies are often employed with such electronic components to attempt to extend the life of the disposable power source associated with the components, such as reducing functionality of the components under certain driving conditions. While such energy saving strategies may extend the life of the disposable power source, they do so at the cost of undesirably reducing the functionality of the electronic component(s) under certain conditions.

Energy harvesting structures that generate electrical current to power electrical components associated with the heavy-duty vehicle have been incorporated into or integrated with components of wheel end assemblies, such as the hubcap, to attempt to eliminate the use of disposable power sources associated with such electronic components. Prior art energy harvesting structures incorporated into or integrated with components of wheel end assemblies often take up a considerable amount of space and are not feasible for use in modern wheel end assemblies due to packaging constraints. Moreover, such prior art energy harvesting structures often include numerous bulky components, and thus undesirably increase the overall weight and operating cost of the heavy-duty vehicle when employed. In addition, such prior art energy harvesting structures often are not sealed within and/or protected by the associated wheel end assembly components, which can potentially result in damage to the energy harvesting structures during operation of the heavy-duty vehicle and/or damage to other components of the wheel end assembly if components of the energy harvesting structures become defective. Moreover, the overall size and power of prior art energy harvesting structures incorporated into or integrated with components of wheel assemblies can potentially induce increased torque on the associated wheel end assemblies, and thus mounted wheels, which can result in power loss to the heavy-duty vehicle.

Thus, there is a need in the art for a rotary union for a heavy-duty vehicle tire inflation system that includes energy harvesting structure integrated into the rotary union for energizing electronic components associated with a heavy-duty vehicle, including the wheel end, such as a wheel end sensor, thereby eliminating the need for disposable energy sources, such as batteries, and minimizing vehicle maintenance associated with such electronic components, thus reducing vehicle downtime. There is also a need in the art for a rotary union that eliminates the need to employ other energy saving strategies with such components when disposable energy sources are utilized, such as limiting functionality of the components under certain circumstances, in order to maximize battery life, thus improving the overall functionality of the components. In addition, there is a need in the art for a rotary union with energy harvesting structure that is housed within and protected by the rotary union, thereby minimizing potential damage to the energy harvesting structure and/or other components of the wheel end assembly, as well as decreasing packaging space and overall vehicle weight, and thus decreasing the cost associated with employing energy harvesting structures in the wheel end of the heavy-duty vehicle. The rotary union with energy harvesting structure of the disclosed subject matter satisfies these needs and overcomes the above-described disadvantages, drawbacks, and limitations, and will now be described.

BRIEF DESCRIPTION OF THE DISCLOSED SUBJECT MATTER

An objective of the disclosed subject matter is to provide a component for a heavy-duty vehicle tire inflation system that includes energy harvesting structure integrated therein for energizing electronic components associated with a heavy-duty vehicle.

Another objective of the disclosed subject matter is to provide a component for a heavy-duty vehicle tire inflation system that eliminates the need for disposable energy sources, such as batteries, to energize electronic components associated with the heavy-duty vehicle, thus minimizing vehicle maintenance associated with such disposable energy sources and reducing vehicle downtime.

Yet another objective of the disclosed subject matter is to provide a component for a heavy-duty vehicle tire inflation system that eliminates the need to employ other energy saving strategies with electronic components associated with a heavy-duty vehicle when disposable energy sources are utilized, such as limiting functionality of the components under certain circumstances in order to maximize battery life, thus improving the overall functionality and life of the components.

Another objective of the disclosed subject matter is to provide a component for a heavy-duty vehicle tire inflation system with structure that houses and encapsulates energy harvesting structure, thereby minimizing potential damage to the energy harvesting structure and/or other components of the wheel end assembly if components of the energy harvesting structure become defective.

Yet another objective of the disclosed subject matter is to provide a component for a heavy-duty vehicle tire inflation system that includes energy harvesting structure with decreased packaging space and overall weight, thus decreasing the overall vehicle weight and the cost associated with employing energy harvesting structure with the heavy-duty vehicle.

These objectives and other are achieved by the rotary union with energy harvesting structure of the disclosed subject matter, which includes a static portion, the static portion remaining static during operation of the heavy-duty vehicle; a rotatable portion, the rotatable portion rotating with one or more rotating components of a wheel end of the heavy-duty vehicle during operation, at least one of the static portion and the rotatable portion being mounted to a component associated with the wheel end, at least one of the static portion and the rotatable portion being in fluid communication with an air source located on the heavy-duty vehicle, the rotary union being in fluid communication with at least one wheel of the wheel end and allowing pressurized air from the air source to flow to the at least one wheel; and energy harvesting structure integrated with the rotary union, the energy harvesting structure generating electricity during operation of the heavy-duty vehicle for energizing one or more electronic components of the heavy-duty vehicle.

BRIEF DESCRIPTION OF THE SEVERAL VIEWS OF THE DRAWINGS

Exemplary embodiments of the disclosed subject matter, illustrative of the best modes in which Applicant has contemplated applying the principles, are set forth in the following description and are shown in the drawings.

Similar numerals and characters refer to similar components throughout the drawings.

DETAILED DESCRIPTION OF THE DISCLOSED SUBJECT MATTER

Figure 1:
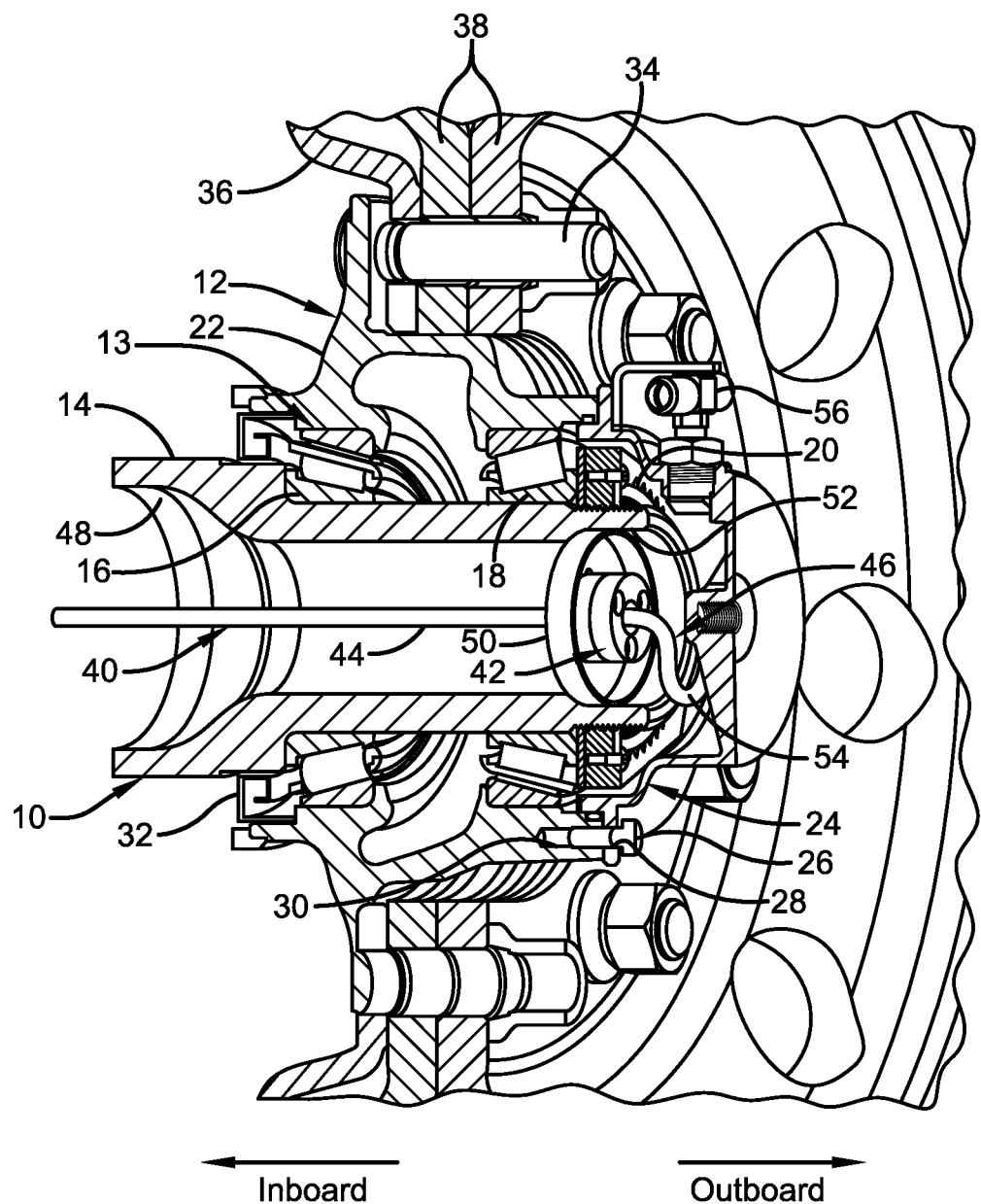
FIG. 1 is a fragmentary perspective view of a portion of an axle spindle of an axle and a wheel end assembly shown in cross-section, showing certain components of a tire inflation system, including a prior art rotary union, and a brake drum and tire rims mounted on a wheel hub of the wheel end assembly.

In order to better understand the rotary union with energy harvesting structure of the disclosed subject matter and the environment in which it operates, a heavy-duty vehicle wheel end assembly that incorporates components of a tire inflation system 40 is shown in FIG. 1, and is indicated generally at reference numeral 12. In a heavy-duty vehicle (not shown), one or more axles 10 typically depend from and extend transversely beneath a frame (not shown) of the heavy-duty vehicle. Axle 10 includes a central tube (not shown) and a pair of axle spindles 14 (only one shown) attached to respective ends of the central tube by any suitable means, such as welding. A wheel end assembly 12 is mounted on each axle spindle 14 of axle 10. Inasmuch as each of axle spindles 14 and their respective wheel end assemblies 12 are similar, for purposes of conciseness and clarity, only one axle spindle and its respective wheel end assembly will be described.

Wheel end assembly 12 includes a bearing assembly 13 with an inboard bearing 16 and an outboard bearing 18 mounted on the outboard end of axle spindle 14. A spindle nut assembly 20 threadably engages the outboard end of axle spindle 14 and secures inboard bearing 16 and outboard bearing 18 in place. A wheel hub 22 of wheel end assembly 12 is rotatably mounted on inboard bearing 16 and outboard bearing 18 in a manner known in the art.

A hubcap 24 of wheel end assembly 12 is mounted on the outboard end of wheel hub 22 by a plurality of bolts 26, each one of which passes through a respective one of a plurality of openings 28 formed in the hubcap, and threadably engages a respective one of a plurality of aligned threaded openings 30 formed in the wheel hub. In this manner, hubcap 24 closes the outboard end of wheel hub 22, and thus wheel end assembly 12. A main continuous seal 32 is rotatably mounted on the inboard end of wheel end assembly 12 and closes the inboard end of the wheel end assembly. In a typical heavy-duty vehicle dual-wheel configuration, a plurality of threaded bolts 34 are used to mount a brake drum 36 and a pair of tire rims 38 on wheel end assembly 12. Each one of a pair of tires (not shown) is mounted on a respective one of tire rims 38, as is known in the art.

As indicated above, wheel end assembly 12 incorporates components of tire inflation system 40. More specifically, a central bore 48 is formed in axle spindle 14 of axle 10, through which a pneumatic conduit 44 of tire inflation system 40 extends toward an outboard end of the axle spindle. Pneumatic conduit 44 is fluidly connected to and extends between an air source (not shown) located on the heavy-duty vehicle, such as an air tank, and a prior art rotary union 42 of tire inflation system 40. Rotary union 42 is attached to a plug 50 that is press-fit in a machined counterbore 52 formed in central bore 48 of axle spindle 14 at an outboard end of the axle spindle, which facilitates the connection of pneumatic conduit 44, which is a static component, to an air tube assembly 46 that rotates with the tires.

Air tube assembly 46 includes a first tube 54 that is fluidly connected at one of its ends to prior art rotary union 42 inside hubcap 24, and is fluidly connected at its other end to a tee fitting 56, which passes through the hubcap and is secured to the hubcap. Additional pneumatic conduits or tubes (not shown) are fluidly connected to and extend from each one of two outlets of tee fitting 56 outside of hubcap 24 to each one of a respective pair of tires mounted on rims 38. In this manner, air passes from the air source located on the heavy-duty vehicle, through pneumatic conduit 44, rotary union 42, first air tube 54, and tee fitting 56, and to the tires. Alternatively, axle 10 may be pressurized, in which case pneumatic conduit 44 is not utilized, and rotary union 42 fluidly communicates directly with the pressurized air in central bore 48. In such configurations, air tube assembly 46 is rotatably connected to rotary union 42 inside hubcap 24, passes through and is secured to the hubcap, and pneumatically connects to the tires via suitable means, such as pneumatic conduits.

Figure 2:
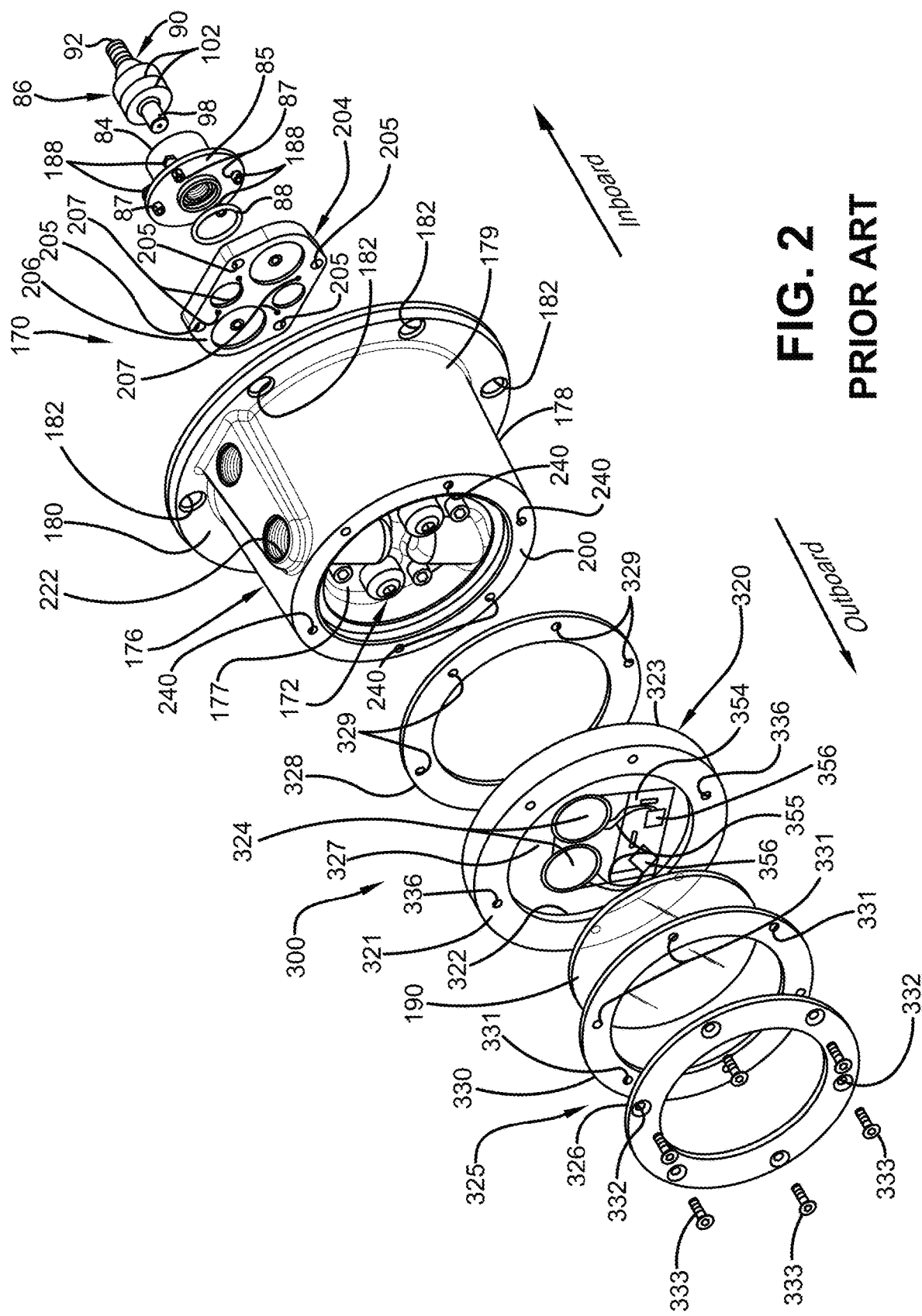
FIG. 2 is an exploded perspective view of a hubcap for a heavy-duty vehicle, viewed looking in an inboard direction, that incorporates tire inflation system components, including a prior art rotary union, and includes a wheel end sensor mounted in the hubcap.
Figure 3:
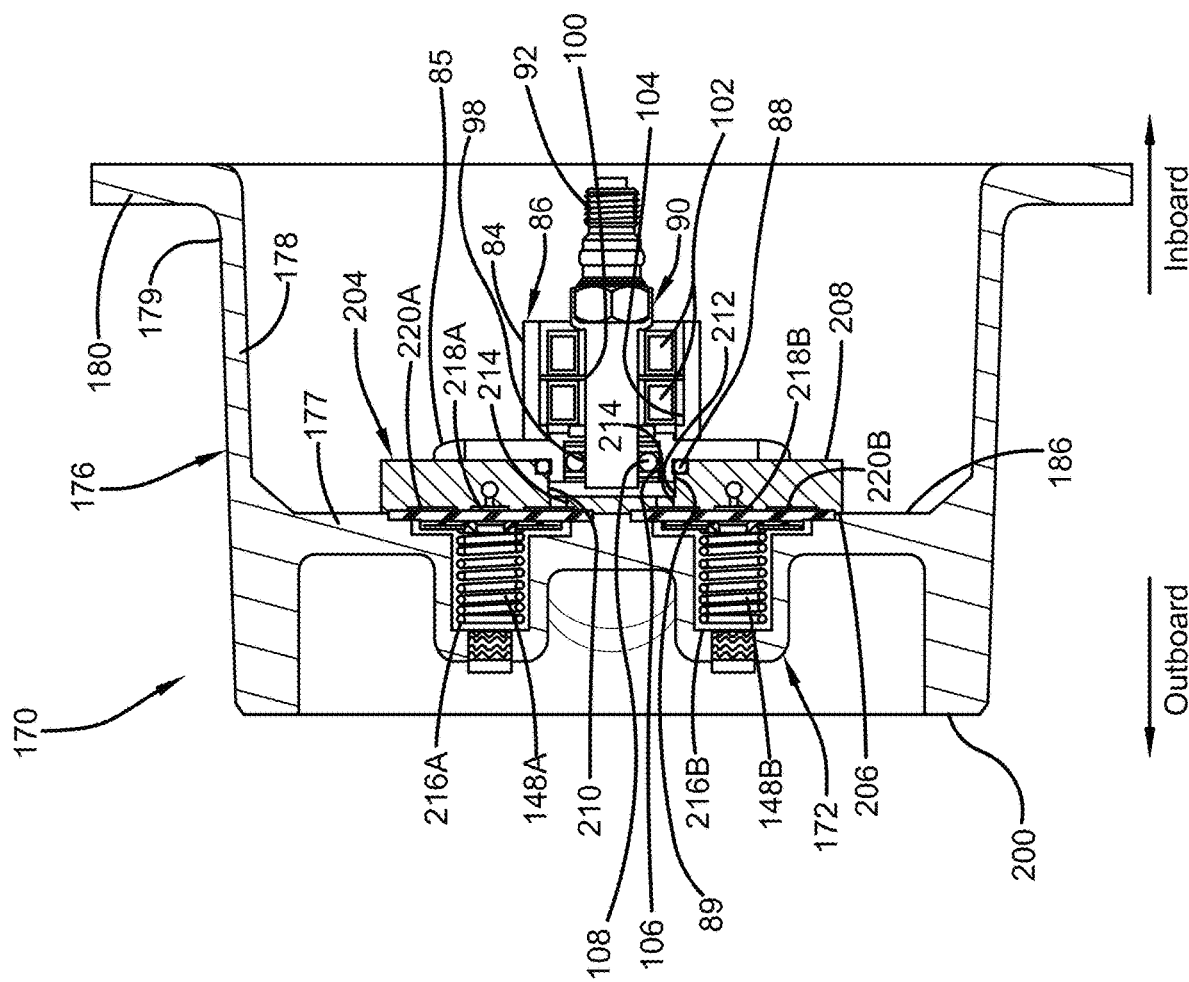
FIG. 3 is a cross-sectional view of the hubcap and incorporated tire inflation system components shown in FIG. 2.

With reference to FIGS. 2-3, in order to further understand the rotary union with energy harvesting structure of the disclosed subjected matter and the environment in which it operates, a hubcap 176 which incorporates and accommodates components of a tire inflation system 170, including a prior art rotary union 86, and employs a wheel end sensor 300 (FIG. 2) to monitor conditions in the associated wheel end assembly, is shown and will now be described. Hubcap 176 is of the type described in U.S. Pat. No. 9,132,704, which is assigned to Applicant of the disclosed subject matter, Hendrickson USA, L.L.C.

Hubcap 176 includes a cylindrical side wall 178. Hubcap 176 further includes an intermediate wall 177 integrally formed with side wall 178. Intermediate wall 177 extends perpendicular to side wall 178. Intermediate wall 177 provides mounting support for components of tire inflation system 170, which will be described in greater detail below. A radially-extending flange 180 is formed on an inboard end portion 179 of side wall 178, and is formed with a plurality of bolt openings 182 (FIG. 2) through which a plurality of bolts (not shown) are disposed to secure hubcap 176 to the outboard end of a wheel hub (not shown) of a wheel end assembly (not shown), such as wheel hub 22 of wheel end assembly 12 (FIG. 1). More specifically, each one of the plurality of bolts passes through a respective one of plurality of bolt openings 182, and threadably engages a respective one of a plurality of aligned threaded openings (not shown) formed in the outboard end of the wheel hub. Hubcap 176 also includes a discrete outboard wall 190 (FIG. 2) to seal the outboard end of the hubcap, and thus the wheel end assembly, which will be described in detail below.

Hubcap 176 incorporates and accommodates mounting of components of tire inflation system 170, including prior art rotary union 86. Tire inflation system 170 includes a dual wheel valve assembly 172 of a type known in the art that is integrated into intermediate wall 177 of hubcap 176. More specifically, and with reference to FIG. 2, dual wheel valve assembly 172 includes a pair of wheel valves 148A and 148B. Each wheel valve 148A and 148B is disposed within a respective wheel valve housing chamber 216A and 216B formed in intermediate wall 177 of hubcap 176 and is attached to the intermediate wall by suitable means, such as fasteners (not shown). In this manner, intermediate wall 177 of hubcap 176 acts as a dual wheel valve housing for wheel valves 148A and 148B. With reference to FIG. 2, hubcap 176 also includes a pair of cylindrical bores 222 formed through side wall 178 and into intermediate wall 177 approximately one hundred-eighty (180) degrees from one another, which enables optimum configuration for two tire hoses (not shown) directly connected to the cylindrical bores via respective couplings, with each hose extending to a respective one of a pair of tires in a heavy-duty vehicle dual-wheel configuration.

Each wheel valve 148A and 148B is a spring-biased diaphragm valve that remains open during normal operating conditions and is capable of isolating each tire in tire inflation system 170 from one or more tires that experience a significant pressure loss, such as if the tire is punctured, as is known. Each wheel valve 148A and 148B is also capable of isolating each tire from the other components of tire inflation system 170 if the system develops a leak that exceeds the inflation capacity of the system, as is also known.

With reference to FIGS. 2-3, tire inflation system 170 further includes a pneumatic distribution plate 204. Pneumatic distribution plate 204 includes an outboard surface 206 that is disposed against an inboard surface 186 (FIG. 3) of intermediate wall 177 of hubcap 176. Pneumatic distribution plate 204 includes an inboard surface 208 (FIG. 3) to which rotary union 86 is positioned against and attached. Pneumatic distribution plate 204 is attached to inboard surface 186 (FIG. 3) of intermediate wall 177 of hubcap 176 via a plurality of fasteners (not shown) disposed through axial openings 205 (FIG. 2) formed in the pneumatic distribution plate that threadably engage aligned axial openings (not shown) formed in the hubcap intermediate wall. With reference to FIG. 3, pneumatic distribution plate 204 includes a central recess 210 and a pair of supply openings 214 formed in the pneumatic distribution plate at the central recess. Each one of supply openings 214 fluidly communicates with a respective wheel valve 148A, 148B housed in intermediate wall 177 of hubcap 176.

With reference to FIGS. 2-3, rotary union 86 includes a housing 84. Housing 84 is formed with a mounting flange 85 for attaching rotary union 86 to pneumatic distribution plate 204 of tire inflation system 170. More specifically, and with reference to FIG. 2, mounting flange 85 of housing 84 is formed with a plurality of openings 87 that align with corresponding openings 207 formed in pneumatic distribution plate 204. A plurality of fasteners 188 are disposed through openings 87 of mounting flange 85 and threadably engage the corresponding openings 207 formed in pneumatic distribution plate 204 to secure housing 84 of rotary union 86 to the pneumatic distribution plate. With reference to FIGS. 2-3, an outboard extension 89 of mounting flange 85 seats within central recess 210 (FIG. 3) of pneumatic distribution plate 204 when housing 84 is attached to the pneumatic distribution plate in the manner described above. A gasket 88 is disposed between mounting flange 85 of rotary union housing 84 and inboard surface 208 (FIG. 3) of pneumatic distribution plate 204 to provide a seal between the rotary union housing and the pneumatic distribution plate.

Rotary union 86 includes a stem 90 with a threaded inboard portion 92. Threaded inboard portion 92 of stem 90 engages a female hose connector (not shown) of a pneumatic conduit (not shown) of tire inflation system 170, such as pneumatic conduit 44 described above (FIG. 1). The pneumatic conduit in turn is connected to and in fluid communication with an air source (not shown) mounted on the heavy-duty vehicle, such as an air tank. Threaded inboard portion 92 of stem 90 can be connected to the pneumatic conduit by any threaded or non-threaded known pneumatic connection means, including threads, push-to-connect fittings, tube fittings, crimped fittings, friction fittings, hose clamps, and the like.

With reference to FIGS. 2-3, stem 90 of rotary union 86 further includes an outboard portion 98 that enables rotatable mounting of housing 84 of the rotary union. More specifically, to facilitate the rotatable mounting of housing 84 of rotary union 86 on outboard portion 98 of stem 90 of the rotary union, each one of a pair of bearings 102 is press-fit onto the outboard portion of the stem, and the outboard portion of the stem, with the bearings, is pressed into a mounting cavity 104 (FIG. 3) formed in the housing. Bearings 102 enable hubcap 72 and attached rotary union housing 84 to rotate about stem 90, which remains static. To provide an additional seal between stem 90 and rotary union housing 84, an outboard groove 106 (FIG. 3) is formed in the housing, and a rotary seal 108 is disposed in the groove on the outboard end of outboard portion 98 of the stem. With reference to FIG. 3, stem 90 is formed with a central bore 100, which facilitates the passage of air through rotary union 86.

With continued reference to FIG. 3, when rotary union 86 is attached inboard surface 208 of pneumatic distribution plate 204, a supply cavity 212 is formed between the rotary union and the pneumatic distribution plate at central recess 210. A pair of supply openings 214 are formed in pneumatic distribution plate 204 at central recess 210, which enables air to flow from central bore 100 of stem 90, through supply cavity 212, and into the pneumatic distribution plate via the supply openings. More particularly, air flows form the air source located on the heavy-duty vehicle, through central bore 100 of stem 90, through supply cavity 212, and through supply openings 214 in pneumatic distribution plate 204, which divide the air flow into two separate paths so that air flows into each wheel valve 148A and 148B.

When each wheel valve 148A and 148B is open, air flows from each respective wheel valve through a respective wheel valve port 218A and 218B formed in pneumatic distribution plate 204, through a respective channel (not shown) formed in the pneumatic distribution plate, and out of the pneumatic distribution plate through a respective exit port 220A and 220B formed in the plate. Each exit port 220A and 220B of pneumatic distribution plate 204 is in fluid communication with a respective cylindrical bore 222 (only one shown—FIG. 2) formed in intermediate wall 177 of hubcap 176, which in turn are fluidly connected to respective tires of the heavy-duty vehicle via a respective coupling (not shown) and pneumatic line (not shown). In the event of a significant pressure loss in one of the tires or in the pneumatic components of tire inflation system 170 that allows the pressure level in the pneumatic conduit to fall below the selected pressure setting, the spring bias of wheel valves 148A and 148B causes them to close, thus isolating each tire from the rest of the tire inflation system.

With reference to FIG. 2, hubcap 176 enables mounting of wheel end sensor 300 in the hubcap. Wheel end sensor 300 is of the type described in U.S. Pat. No. 9,933,337, which is assigned to Applicant of the disclosed subject matter, Hendrickson USA, L.L.C. Wheel end sensor 300 includes a sensor block 320 formed with a perimeter ring 321 for mounting the wheel end sensor 300 in hubcap 176. Sensor block 320 also includes a component mounting block 327 integrally formed inside of perimeter ring 321. Component mounting block 327 is formed with a plurality of different sized and shaped recesses (not shown) for receiving components of wheel end sensor 300. A main circuit board 354 and a pair of batteries 324 for supplying electrical energy to the circuit board via a respective pair of wires 355 are attached to and housed within the recesses formed in component mounting block 327 by any suitable means known in the art. Main circuit board 354 includes sensor instrumentation (not shown) for sensing certain designated operational conditions and generates data signals in a known manner. Main circuit board 354 includes one or more processors 356 that receive the data signals from the sensor instrumentation to collect and processes the sensed data. Wheel end sensor 300 also includes a light emitting diode (LED) readout (not shown) operatively connected to main circuit board 354, which provides a visual indicator of undesirable operating conditions that may require attention or service within the wheel end assembly, as programmed in the main circuit board. Alternatively, wheel end sensor 300 may include an integrated RF antenna operatively connected to main circuit board 354, which is utilized to generate signals for wireless data transfer to a receiver that may or may not be visible to the vehicle operator during vehicle operation that indicates such undesirable operation conditions or for wireless data transfer to a remote receiver to enable central collection and analysis, such as a computer or smart phone.

Sensor block 320 is mounted in hubcap 176 utilizing a wheel end sensor mounting assembly 325 of the hubcap. Wheel end sensor mounting assembly 325 generally includes a retaining ring 326, a ring-shaped first gasket 328, and a ring-shaped second gasket 330. First gasket 328 is disposed between an inboard surface 323 of perimeter ring 321 and an outboard end 200 (FIGS. 2-3) of side wall 178 of hubcap 176. First gasket 328 is formed with a plurality of circumferentially spaced openings 329. Perimeter ring 321 is formed with a plurality of circumferentially spaced openings 336, which extend axially through the perimeter ring. Openings 336 of perimeter ring 321 are circumferentially aligned with plurality of openings 329 of first gasket 328 and a plurality of circumferentially spaced threaded openings 240 formed in outboard end 200 of side wall 178 of hubcap 176.

With continued reference to FIG. 2, outboard wall 190 of hubcap 176 seats in a circumferentially extending recess 322 formed in perimeter ring 321 so that its outboard surface is coplanar with the outboard surface of the perimeter ring. A gasket or an O-ring (not shown) is disposed between outboard wall 190 of hubcap 176 and recess 322 to provide a seal between the outboard wall and the recess to protect electronic components of wheel end sensor 300 from entry of contaminants. Outboard wall 190 can be tinted, transparent, or translucent to enable a vehicle operator to view the LED readout of main circuit board 354, if employed, and/or enable visual inspection of components of wheel end sensor 300 and/or undesirable operating conditions within the wheel end assembly, including within hubcap 176.

Second gasket 330 of wheel end sensor mounting assembly 325 is disposed between the inboard surface of retaining ring 326 and the coplanar junction of the outboard surface of outboard wall 190 of hubcap 176 and the outboard surface of perimeter ring 321 of sensor block 320. Second gasket 330 is formed with a plurality of circumferentially spaced openings 331, which are circumferentially aligned with openings 336 of perimeter ring 321. Retaining ring 326 is formed with plurality of circumferentially spaced openings 332 which extend through the retaining ring and are circumferentially aligned with plurality of openings 331 of second gasket 330. A plurality of bolts or other mechanical fasteners 333 are disposed through respective aligned openings 332 of retaining ring 326, openings 331 of second gasket 330, openings 336 of perimeter ring 321, openings 329 of first gasket 328, and threadably engage threaded openings 240 of outboard end 200 of side wall 178 of hubcap 176 to capture and secure wheel end sensor 300 in the hubcap.

While generally suitable for its intended purpose, wheel end sensor 300 employs batteries 324 for supplying electrical energy to circuit board 354 and powering the sensor instrumentation associated with the wheel end sensor. Batteries 324, which are disposable power sources, eventually need replaced, which requires removal of wheel end sensor 300 from hubcap 176, resulting in increased vehicle maintenance and cost, as well as downtime of the heavy-duty vehicle. In addition, removal of wheel end sensor 300 from the hubcap 176 may expose the interior of the hubcap, potentially resulting in entry of contaminants into the hubcap or escape of lubricant from the hubcap, and thus the wheel end assembly. While wheel end sensor 300 could employ energy saving strategies to attempt to extend the life of batteries 324, for example, reducing functionality of certain components of the wheel end sensor under certain operational conditions of the heavy-duty vehicle, such strategies undesirably reduce the functionality of the wheel end sensor under the conditions. The rotary union with energy harvesting structure of the disclosed subject matter overcomes the above described disadvantages, drawbacks, and limitations and will now be described.

Figure 4:
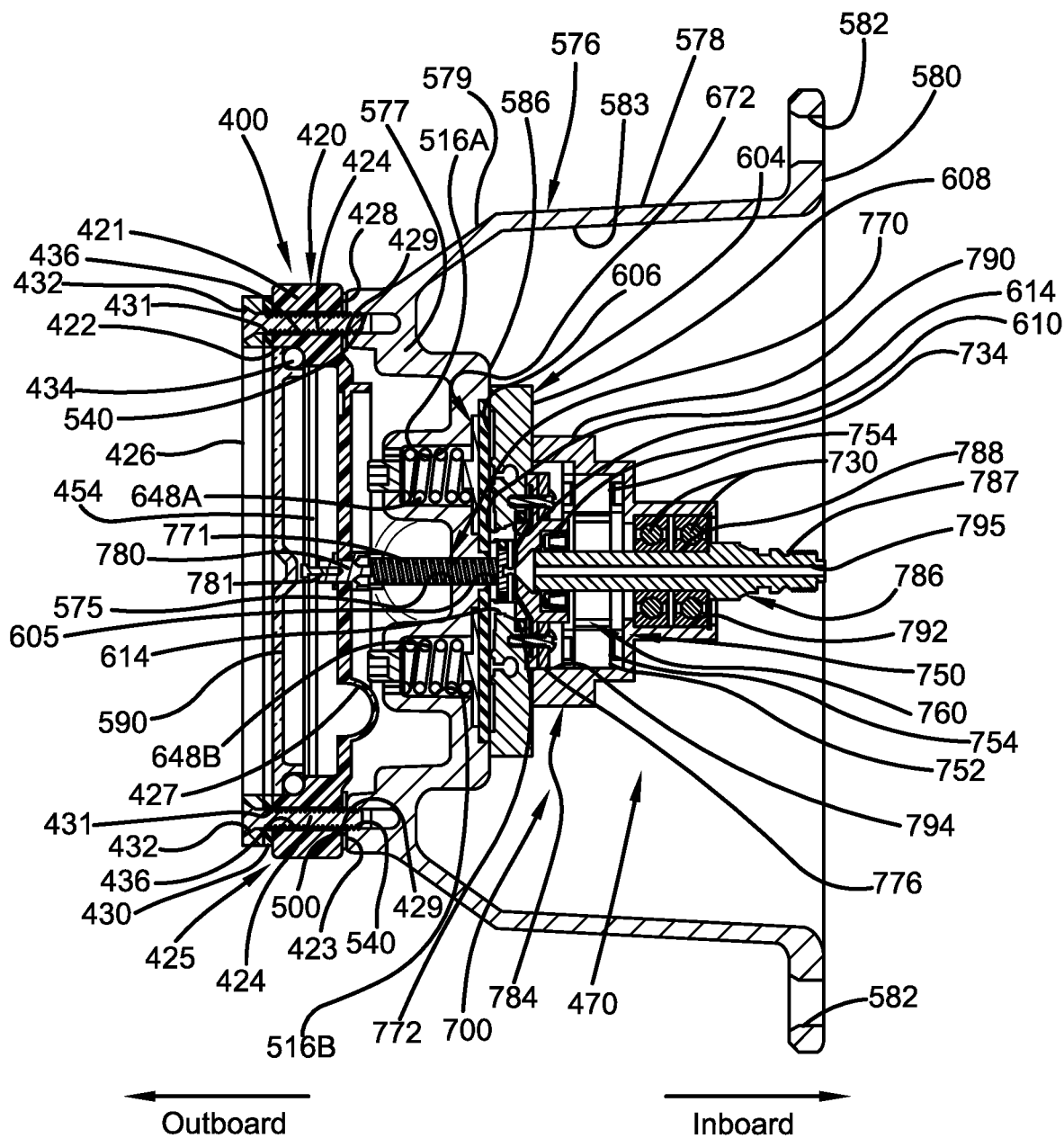
FIG. 4 is a cross-sectional view of a hubcap that incorporates components of a tire inflation system, including a first exemplary embodiment rotary union with integrated energy harvesting structure of the disclosed subject matter.
Figure 5:
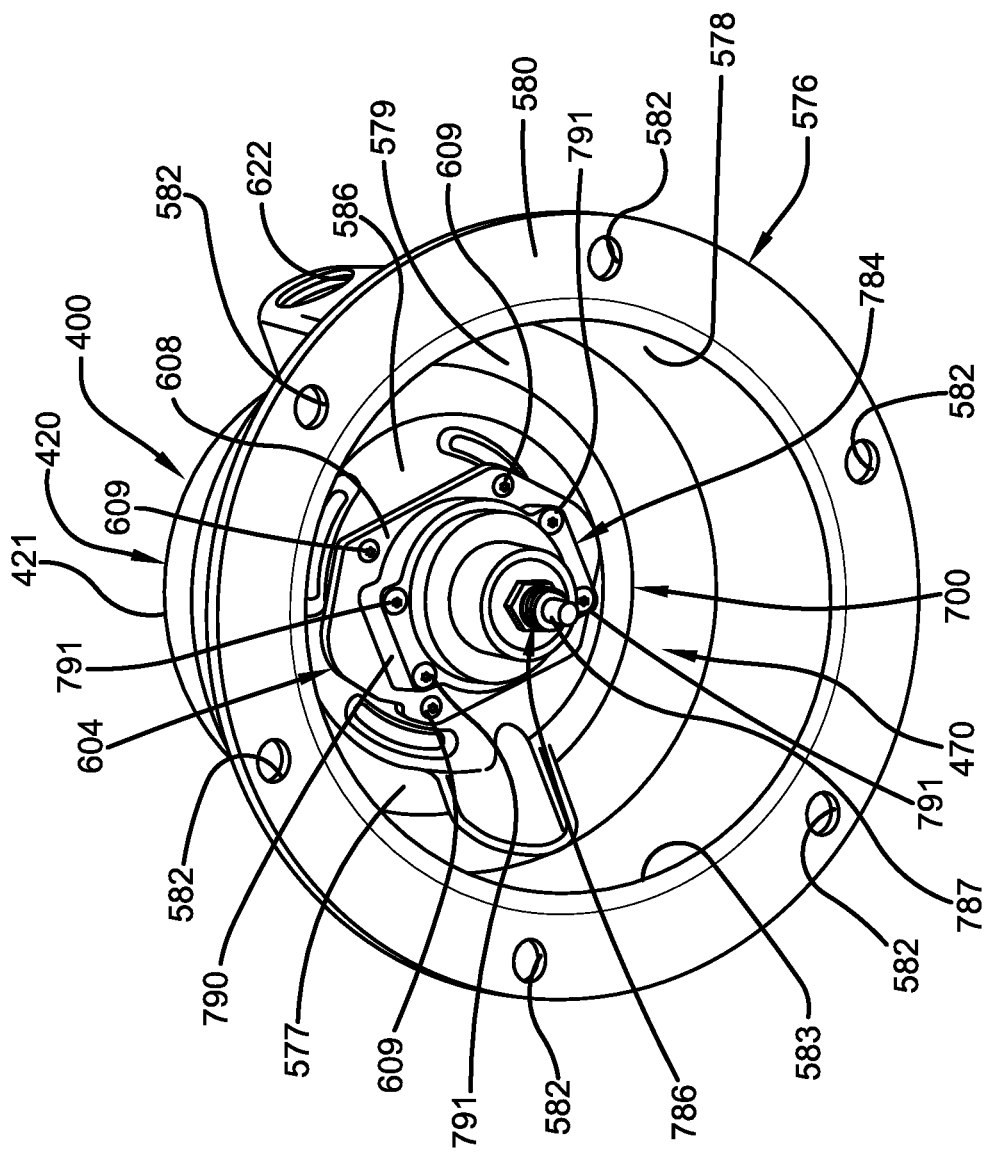
FIG. 5 is a perspective view of the hubcap and first exemplary embodiment rotary union shown in FIG. 4, viewed looking in an outboard direction.

A first exemplary embodiment rotary union with energy harvesting structure of the disclosed subject matter is shown in FIGS. 4-8 and is indicated generally at 700. First exemplary embodiment rotary union 700 is shown employed with a tire inflation system 470 (FIGS. 4-6) that includes components that are incorporated into or mounted on a hubcap 576 (FIGS. 4-5), which also mounts a wheel end sensor 400 (FIGS. 4-5). Hubcap 576 is of the type described in U.S. Pat. No. 9,132,704, which is assigned to Applicant of the disclosed subject matter, Hendrickson USA, L.L.C.

With reference to FIGS. 4-5, hubcap 576 is similar in structure and function to hubcap 176 described above, and generally includes a cylindrical side wall 578. Hubcap 576 also includes a frustoconical transition portion 579 extending outboardly from side wall 578. An intermediate wall 577 of hubcap 576 is integrally formed with frustoconical transition portion 579 and extends generally perpendicular to side wall 578. Intermediate wall 577 provides mounting support for components of tire inflation system 470, which will be described in greater detail below. Intermediate wall 577 is also formed with a central opening 575 (FIG. 4), the importance of which will be described below. It is to be understood that other shapes and configurations of hubcap 576, including side wall 578, transition portion 579, and/or intermediate wall 577 may be employed without affecting the overall concept or operation of the disclosed subject matter, such as an integrated dome or cone shape formed as one piece or multiple pieces, and/or adjusting the intermediate wall to be an outboard wall.

A radially-extending flange 580 is formed on the inboard end of side wall 578 of hubcap 576, and is formed with a plurality of bolt openings 582 to enable bolts (not shown) to secure hubcap 576 to the outboard end of a wheel hub (not shown) of a wheel end assembly, such as wheel hub 22 (FIG. 1) of wheel end assembly 12 (FIG. 1) described above. In this manner, hubcap 576 defines an interior compartment 583. It is to be understood that means known to those skilled in the art other than bolts may be used to secure hubcap 576 to the wheel hub, such as a threaded connection between the hubcap and the wheel hub, other types of mechanical fasteners, and/or a press-fit. With reference to FIG. 4, hubcap 576 also includes a discrete outboard wall 590 to seal the outboard end of the hubcap, and thus the wheel end assembly. With reference to FIG. 4, wheel end sensor 400 is mounted in hubcap 576. Wheel end sensor 400 is similar to wheel end sensor 300 described above and is of the type described in U.S. Pat. No. 9,933,337, which is assigned to Applicant of the disclosed subject matter, Hendrickson USA, L.L.C. With reference to FIGS. 4-5, wheel end sensor 400 includes a sensor block 420 formed with a perimeter ring 421 for mounting the wheel end sensor in hubcap 576. Sensor block 420 also includes a component mounting block 427 (FIG. 4) integrally formed inside of perimeter ring 421. Component mounting block 427 is formed with a plurality of different sized and shaped recesses (not shown) for receiving components of wheel end sensor 400, including a main circuit board 454 (FIG. 4) and related processors, an LED readout (not shown), an integrated RF antenna (not shown), if employed, and sensor instrumentation (not shown), which are attached to and housed within the recesses by any suitable means known in the art.

With reference to FIG. 4, sensor block 420, and thus wheel end sensor 400, is mounted in hubcap 576 utilizing a wheel end sensor mounting assembly 425. Wheel end sensor mounting assembly 425 generally includes a retaining ring 426, a ring-shaped first gasket 428, and a ring-shaped second gasket 430. First gasket 428 is disposed between an inboard surface 423 of perimeter ring 421 and an outboard end 500 of transition portion 579 of hubcap 576. First gasket 428 is formed with a plurality of circumferentially spaced openings 429. Perimeter ring 421 is formed with a plurality of circumferentially spaced openings 436 (FIG. 4), which extend axially through the perimeter ring. Openings 436 of perimeter ring 421 are circumferentially aligned with plurality of openings 429 of first gasket 428 and a plurality of circumferentially spaced threaded openings 540 formed in outboard end 500 of transition portion 579 of hubcap 576.

Outboard wall 590 of hubcap 576 seats in a circumferentially extending recess 422 formed in perimeter ring 421 so that its outboard surface is coplanar with the outboard surface of the perimeter ring. A gasket or an O-ring 434 is disposed between outboard wall 590 of hubcap 576 and recess 422 of perimeter ring 421 to provide a seal between the outboard wall and the recess to protect electronic components of wheel end sensor 400 from entry of contaminants, such as main circuit board 454. Outboard wall 590 of hubcap 576 is tinted, transparent, or translucent to enable visual inspection of components of wheel end sensor 400, such as the LED readout, if employed, to determine if undesirable operating conditions exist within the wheel end assembly, and/or check lubricant levels within hubcap 576.

Second gasket 430 of wheel end sensor mounting assembly 425 is disposed between the inboard surface of retaining ring 426 of the wheel end sensor mounting assembly and the coplanar junction of the outboard surface of outboard wall 590 and the outboard surface of perimeter ring 421 of sensor block 420. Second gasket 430 is formed with a plurality of circumferentially spaced openings 431. Retaining ring 426 is formed with plurality of circumferentially spaced openings 432 which extend through the retaining ring and are circumferentially aligned with plurality of openings 431 of second gasket 430. A plurality of bolts 424 or other mechanical fasteners are disposed through respective aligned openings 432 of retaining ring 426, openings 431 of second gasket 430, openings 436 of perimeter ring 421, openings 429 of first gasket 428, and threadably engage threaded openings 540 of outboard end 500 of transition portion 579 of hubcap 576 to capture and secure wheel end sensor 400 in the hubcap. It is to be understood that hubcap 576 and/or wheel end sensor mounting assembly 425 could include different components, configurations, and/or structures than that shown and described without affecting the overall concept or operation of the disclosed subject matter.

With reference to FIGS. 4-5, hubcap 576 incorporates and accommodates mounting of components of tire inflation system 470, including first exemplary embodiment rotary union with energy harvesting structure 700. Tire inflation system 470 is generally similar in structure and function to tire inflation system 170 described above, except that it employs first exemplary embodiment rotary union 700. With reference to FIG. 4, tire inflation system 470 includes a dual wheel valve assembly 672 that is integrated into intermediate wall 577 of hubcap 576. More specifically, dual valve assembly 672 includes a pair of wheel valves 648A and 648B. Each wheel valve 648A and 648B is disposed within a respective wheel valve housing chamber 516A and 516B formed in intermediate wall 577 of hubcap 576. In this manner, intermediate wall 577 of hubcap 576 acts as a dual wheel valve housing for wheel valves 648A and 648B. With reference to FIG. 5, hubcap 576 also includes a pair of cylindrical bores 622 (only one shown) formed approximately one-hundred-eighty (180) degrees from one another in intermediate wall 577, which enables optimum configuration for two tires hoses (not shown) directly connected to the cylindrical bores via respective couplings (not shown), with each hose extending to a respective one of a pair of tires in a heavy-duty vehicle dual-wheel configuration. Alternatively, a single tire hose (not shown) may be connected to one of cylindrical bores 622 via a respective coupling (not shown) and the other cylindrical bore plugged or sealed, with the single tire hose extending to and being connected to a single tire (not shown), such as a wide-based single tire, in a heavy-duty vehicle single-wheel configuration. In such heavy-duty vehicle single-wheel configurations, hubcap 576 may be formed with only a single cylindrical bore 622, to which the single tire hose is connected via a coupling.

Each wheel valve 648A and 648B is a spring-biased diaphragm valve that remains open during normal operating conditions and is capable of isolating each tire in tire inflation system 470 from one or more tires that experience a significant pressure loss, such as if the tire is punctured. Each wheel valve 648A and 648B is also capable of isolating each tire from the other components of tire inflation system 470 if the system develops a leak that exceeds the inflation capacity of the system.

Figure 6:
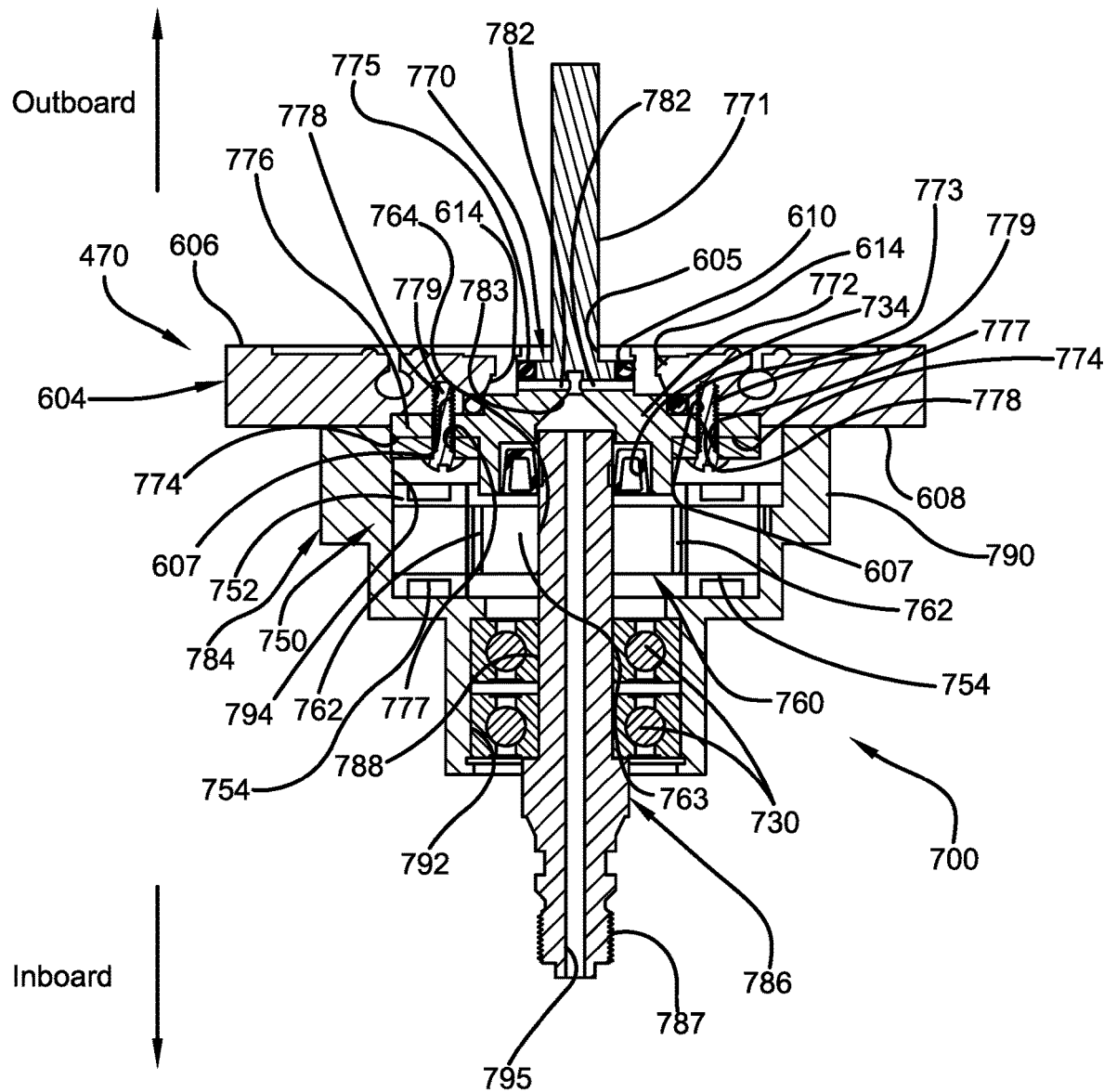
FIG. 6 is an enlarged cross-sectional view of the first exemplary embodiment rotary union shown in FIG. 4, shown removed from the hubcap.

With reference to FIGS. 4-6, tire inflation system 470 further includes a pneumatic distribution plate 604, which is generally similar in structure and function to pneumatic distribution plate 204 described above. Pneumatic distribution plate 604 includes an outboard surface 606 (FIGS. 4 and 6) that is disposed against an inboard surface 586 (FIGS. 4 and 6) of intermediate wall 577. Pneumatic distribution plate 604 includes an inboard surface 608 to which first exemplary embodiment rotary union 700 is attached, as will be described below. With reference to FIG. 5, pneumatic distribution plate 604 is attached to inboard surface 586 of intermediate wall 577 of hubcap 576 via a plurality of fasteners 609 disposed through axial openings (not shown) formed in the pneumatic distribution plate that threadably engage aligned axial openings (not shown) formed in the hubcap intermediate wall. With reference to FIGS. 4 and 6, pneumatic distribution plate 604 includes a central recess 610 and a pair of supply openings 614 formed in the pneumatic distribution plate at the central recess. Each one of supply openings 614 of pneumatic distribution plate 604 fluidly communicates with a respective wheel valve 648A and 648B housed in intermediate wall 577 of hubcap 576.

Figure 7:
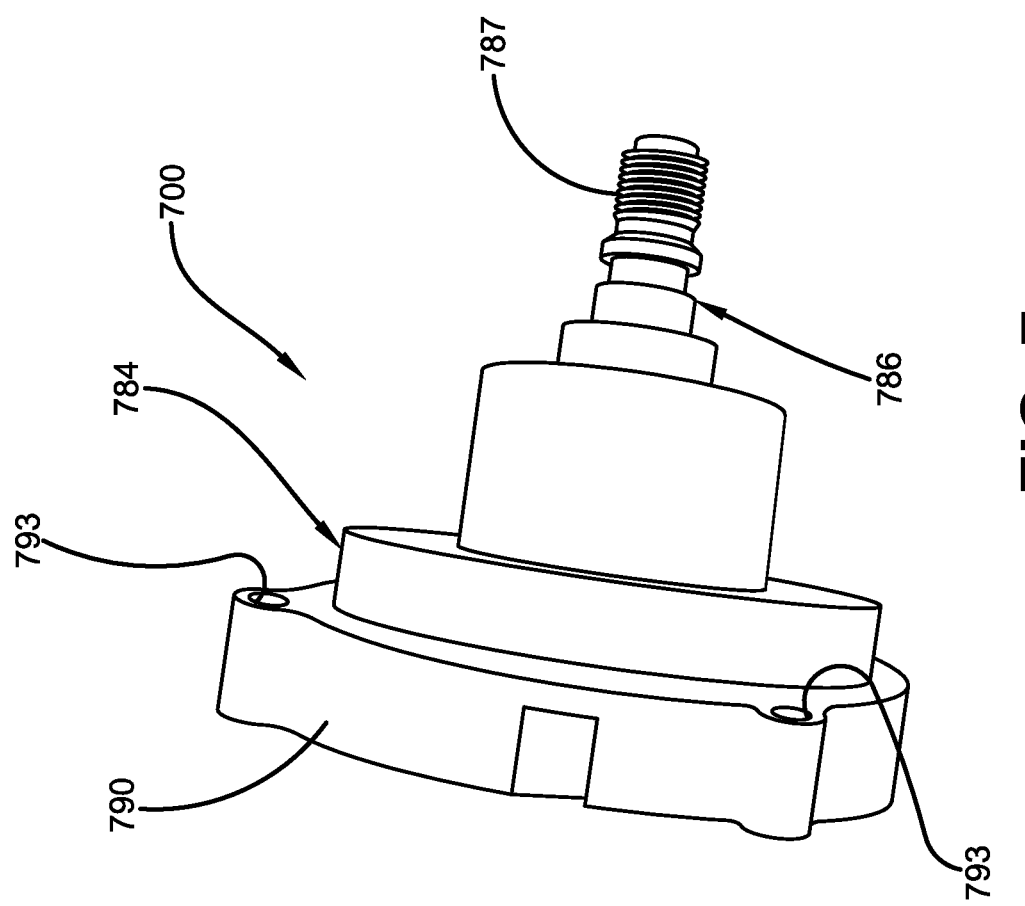
FIG. 7 is an enlarged perspective view of the first exemplary embodiment rotary union shown in FIG. 4, shown removed from the hubcap.
Figure 8:
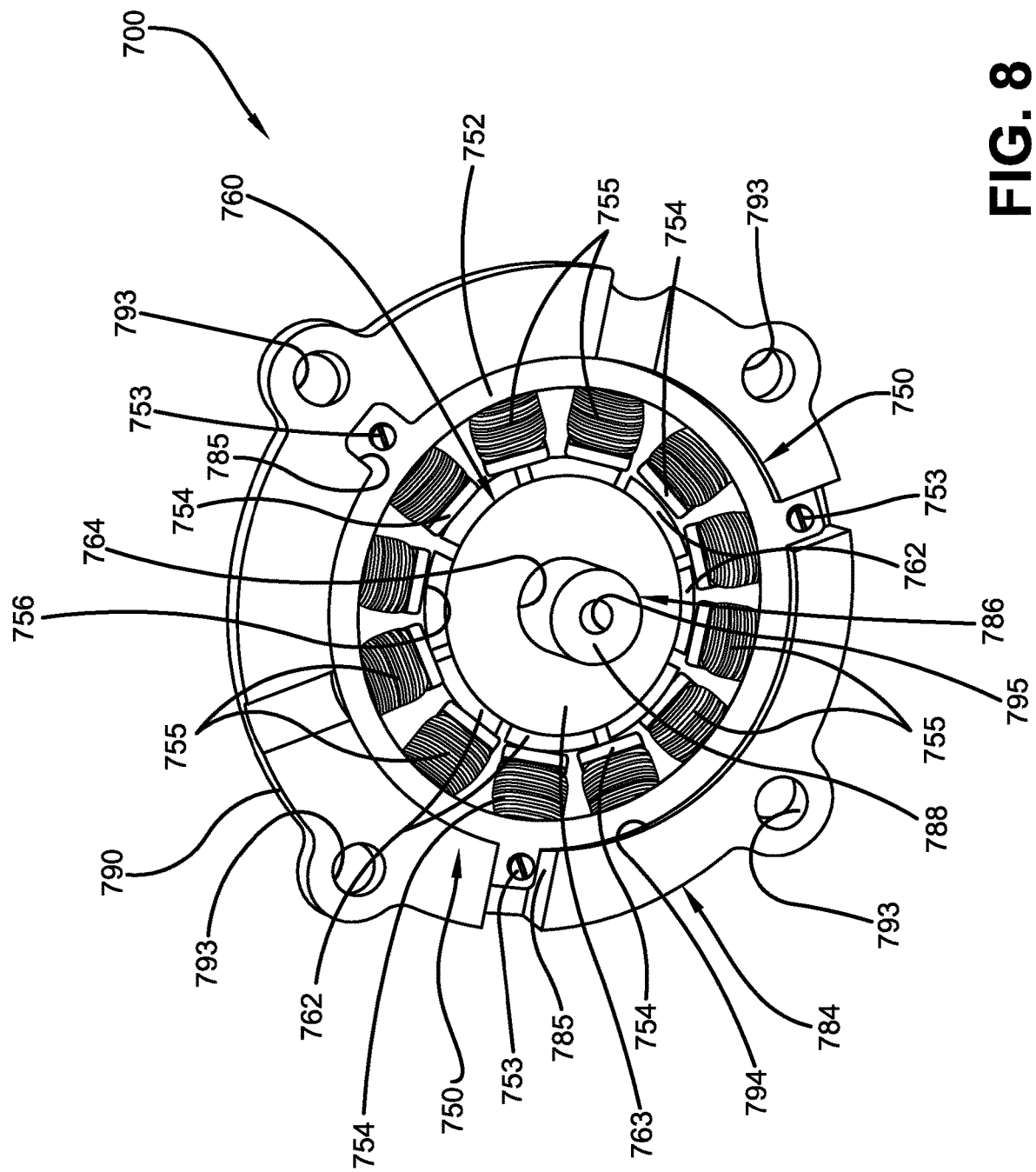
FIG. 8 is a perspective view of the first exemplary embodiment rotary union shown in FIG. 6, viewed looking in an inboard direction, showing the pneumatic distribution plate removed and showing energy harvesting structure integrated into the rotary union.

With reference to FIGS. 4-8, first exemplary embodiment rotary union 700 is employed as a component of tire inflation system 470. Rotary union 700 includes a housing 784. Housing 784 has a generally cylindrical/stepped shaped and is formed of a suitable rigid material, such as aluminum. With reference to FIGS. 4 and 6, housing 784 is formed with a first cavity 792 and second cavity 794. With reference to FIGS. 4-8, housing 784 further includes a mounting flange 790 for attaching rotary union 700 to pneumatic distribution plate 604 of tire inflation system 470. More specifically, and with particular reference to FIGS. 7-8, mounting flange 790 is formed with a plurality of openings 793 that align with a corresponding plurality of openings (not shown) formed in inboard surface 608 of pneumatic distribution plate 604. With reference to FIGS. 5 and 7-8, a plurality of fasteners 791 (FIG. 5) are disposed through openings 793 of mounting flange 790 and threadably engage the corresponding openings formed in inboard surface 608 of pneumatic distribution plate 604 to secure housing 784 of rotary union 700 to the pneumatic distribution plate. A gasket (not shown) may be disposed between housing 784 of rotary union 700 and inboard surface 608 of pneumatic distribution plate 604 to provide a seal between the rotary union housing and the pneumatic distribution plate.

With reference to FIGS. 4-8, first exemplary embodiment rotary union 700 includes a stem 786 with a threaded inboard portion 787 (FIGS. 4-7) that engages a female hose connector (not shown) of a pneumatic conduit (not shown) connected to and in fluid communication with an air source (not shown) mounted on the heavy-duty vehicle, such as an air tank. It is to be understood that stem 786 could be connected to the pneumatic conduit by any suitable known pneumatic connection means, such as threaded or non-threaded means including threads, push-to-connect fittings, tube fittings, crimped fittings, friction fittings, hose clamps, and the like, without affecting the overall concept or operation of the disclosed subject matter. With reference to FIGS. 4, 6, and 8, stem 786 of rotary union 700 further includes an outboard portion 788 that enables rotatable mounting of housing 784. Stem 786 is formed with a central bore 795 that is in fluid communication with the pneumatic conduit connected to threaded inboard portion 787. Central bore 795 extends entirely through threaded inboard portion 787 and outboard portion 788 of stem 786. It is to be understood that stem 786 can include other structure, shapes, and/or configurations than that shown and described without affecting the overall concept and operation of the disclosed subject matter.

With reference to FIGS. 4 and 6, to facilitate rotatable mounting of housing 784 of first exemplary embodiment rotary union 700 about outboard portion 788 of stem 786, a pair of bearings 730 are press-fit on the stem outboard portion, and the stem outboard portion, with the bearings, is press-fit in first cavity 792 formed in the housing. Bearings 730 thus enable housing 784 attached to pneumatic distribution plate 604, which in turn is attached to intermediate wall 577 of hubcap 576, to rotate with the hubcap about stem 786, which remains static.

In accordance with an important aspect of the disclosed subject matter, first exemplary embodiment rotary union 700 enables operation of the rotary union for use with tire inflation system 470, as well as includes energy harvesting structure which takes advantage of the rotation of hubcap 576 and the attached rotary union to generate electricity for energizing wheel end sensor 400 and components thereof. More specifically, and with reference to FIGS. 4, 6, and 8, rotary union 700 includes an energy harvesting assembly 750 integrated into the rotary union. Energy harvesting assembly 750 includes a coil mount 752. Coil mount 752 is generally annularly shaped and is disposed within second cavity 794 of housing 784 of rotary union 700. Coil mount 752 is attached to mounting flange 790 of housing 784 via fasteners 753 (FIG. 8), which are disposed through openings (not shown) formed in the coil mount and threadably engage corresponding openings (not shown) formed in recesses 785 (FIG. 8) of the mounting flange. Coil mount 752 is formed with a plurality of radial arms 754 extending radially inwardly from the coil mount, which terminate to form a generally segmented central opening 756 (FIG. 8), providing the coil mount with its generally annular shape. With reference to FIG. 8, a coil 755 formed of a suitable metal material is wound around each radial arm 754, the importance of which will be described below. Each coil 755 preferably is formed of copper or other electrical winding material known in the art.

With reference to FIGS. 4, 6, and 8, energy harvesting assembly 750 further includes a generally annular stator 760. Stator 760 is disposed within second cavity 794 of housing 784 of rotary union 700 such that it is positioned within central opening 756 (FIG. 8) of coil mount 752. Stator 760 includes an annular body 763 with a central opening 764 through which outboard portion 788 of stem 786 of rotary union 700 is disposed. Stator 760 is attached to outboard portion 788 of stem 786 by any suitable means, such as welds, threads, or press-fit. Stator 760 includes a plurality of magnets 762 (FIGS. 6 and 8) attached to and circumferentially spaced about the radially outward end of the stator by any suitable means, such as adhesive. As shown, stator 760 includes eight magnets 762 attached to and spaced circumferentially about body 763, but could include more or less magnets without affecting the overall concept or operation of the disclosed subject matter. As stator 760 is attached to outboard portion 788 of stem 786, magnets 762 are statically mounted and positioned in a precise location adjacent the radially inward ends of radial arms 754 of coil mount 752, the importance of which will be described below.

With reference to FIGS. 4 and 6, energy harvesting assembly 750 of first exemplary embodiment rotary union 700 further includes a power routing assembly 770. Power routing assembly 770 includes a body portion 772, which is seated within central recess 610 of pneumatic distribution plate 604 of tire inflation system 470 and extends inboardly from the pneumatic distribution plate such that it a partially disposed within second cavity 794 of housing 784. Body portion 772 is formed with an exterior of a non-conductive material, such as a plastic, and an interior of a suitable electrically conductive material, such as steel, nickel plated beryllium copper, or a copper alloy. With particular reference to FIG. 6, a first O-ring 773 and a second O-ring 775 are positioned between body portion 772 of power routing assembly 770 and central recess 610 of pneumatic distribution plate 604 of tire inflation system 470 to provide seals between the power routing assembly and the pneumatic distribution plate.

With continued reference to FIG. 6, body portion 772 of power routing assembly 770 is formed with a radially extending recess 774. With reference to FIGS. 4 and 6, a rectifying PC board 776 is disposed within recess 774, the importance of which will be described in detail below. With particular reference to FIG. 6, rectifying PC board 776 is formed with a plurality of circumferentially spaced openings 777. Openings 777 of rectifying PC board 776 align with corresponding openings 778 formed in body portion 772 and corresponding threaded openings 607 formed in inboard surface 608 of pneumatic distribution plate 604 of tire inflation system 470. A plurality of fasteners 779 are disposed through respective aligned openings 777 of rectifying PC board 776 and openings 778 of body portion 772 of power routing assembly 770, and threadably engage threaded openings 607 of inboard surface 608 of pneumatic distribution plate 604 to secure the PC board to the body portion. Rectifying PC board 776 is operatively connected to coils 755 of energy harvesting assembly 750 by any suitable means, such as a wire(s) (not shown).

With reference to FIGS. 4 and 6, power routing assembly 770 further includes a conductive rod 771 formed with body portion 772. Like body portion 772 of power routing assembly 770, rod 771 is formed with an exterior of a non-conductive material, such as a plastic, and an interior with a suitable electrically conductive material, such as steel, nickel plated beryllium copper, or a copper alloy. Rod 771 extends outboardly from body portion 772 and passes through a central opening 605 formed in pneumatic distribution plate 604 of tire inflation system 470 and central opening 575 (FIG. 4) of intermediate wall 577 (FIGS. 4-5) of hubcap 576 (FIGS. 4-5). With reference to FIG. 4, power routing assembly 770 includes a power routing connector 780 that is attached to the outboard end of rod 771. Power routing connector 780 is attached directly to main circuit board 454 of wheel end sensor 400 via a fastener 781, the importance of which will be described below.

With particular reference to FIG. 6, power routing assembly 770 provides a flow path to route air from central bore 795 of stem 786 of first exemplary embodiment rotary union 700 and into pneumatic distribution plate 604 of tire inflation system 470. More specifically, body portion 772 of power routing assembly 770 is formed with a pair of supply openings 782. Each supply opening 782 is in fluid communication with a respective supply opening 614 formed in pneumatic distribution plate 604 and a supply cavity 783 formed between outboard portion 788 of stem 786 and body portion 772 of power routing assembly 770. With reference to FIGS. 4 and 6, supply cavity 783 is sealed from second cavity 794 and first cavity 792 of housing 784 of rotary union 700 via a rotary seal 734 disposed on the outboard end of outboard portion 788 of stem 786, such that it is positioned between the stem and body portion 772 of power routing assembly 770.

In this manner, first exemplary embodiment rotary union 700 provides a sealed flow path that enables transfer of air from the air source mounted on the heavy-duty vehicle, through the pneumatic conduit, stem 786, supply cavity 783, supply openings 614 of pneumatic distribution plate 604, and into each wheel valve 648A and 648B. When each wheel valve 648A and 648B is open, air flows from each respective wheel valve through a respective wheel valve port (not shown) formed in pneumatic distribution plate 604, through a respective channel (not shown) formed in the pneumatic distribution plate, and out of the pneumatic distribution plate through a respective exit port (not shown) formed in the plate. Each of the exit ports of pneumatic distribution plate 604 is in fluid communication with a respective cylindrical bore 622 (only one shown—FIG. 5) formed in intermediate wall 577 of hubcap 576, which in turn are connected to respective vehicle tires via respective couplings (not shown) and hoses (not shown). The sealed flow path provided by first exemplary embodiment rotary union 700 ensures that other energy harvesting components of energy harvesting assembly 750 of the rotary union, such as coil mount 752, including coils 755, and stator 760, including magnets 762, are not within the pressurized air path of the rotary union, thereby preventing potential damage to such components from the pressurized air during operation of tire inflation system 470.

In addition, first exemplary embodiment rotary union 700 also is capable of generating electricity for energizing wheel end sensor 400 mounted in hubcap 576 during operation of the heavy-duty vehicle. More specifically, during operation of the heavy-duty vehicle, as hubcap 576 rotates, because housing 784 of rotary union 700 is attached to pneumatic distribution plate 604, which in turn is attached to intermediate wall 577 of the hubcap, the housing also rotates. Consequently, coil mount 752, which is attached to housing 784 of rotary union 700, and thus coils 755 wound on radial arms 754 of the coil mount, rotate about magnets 762 attached to stator 760, which remain static with stem 786 of rotary union 700. As coils 755 rotate about magnets 762, the close proximity of the coils and the magnets enables an AC current to be produced in the coils. As rectifying PC board 776 is in close proximity and operatively connected to coils 755, the AC current generated is transmitted to the PC board, which in turn converts the AC current to DC current via one or more circuits (not shown) of the PC board. The DC current in turn is transferred from rectifying PC board 776, through body portion 772 of power routing assembly 770 to which the PC board is attached, through rod 771 of the power routing assembly, and to power routing connector 780. Because connector 780 is directly attached to main circuit board 454 of wheel end sensor 400, the DC current generated by energy harvesting assembly 750 of rotary union 700 can be utilized to directly power the wheel end sensor and associated components, such as processors associated with the main circuit board, sensor instrumentation, the LED readout, and/or the integrated RF antenna, if employed.

In this manner, energy harvesting assembly 750 of first exemplary embodiment rotary union 700 is capable of generating electrical current to power wheel end sensor 400 and its associated components, thereby eliminating the need for disposable power sources, such as batteries, to power the wheel end sensor and its associated components. Moreover, as energy harvesting assembly 750 of first exemplary embodiment rotary union 700 is capable of generating electrical current to power wheel end sensor 400 and its associated components, the rotary union eliminates the need to employ energy saving strategies with wheel end sensor 400 to conserve energy, such as limiting functionality under certain circumstances in order to maximize battery life when batteries are employed by a wheel end sensor, thus improving the overall functionality of the wheel end sensor and associated components.

It is contemplated that the electrical current generated by energy harvesting assembly 750 of rotary union 700 could also be stored via an electrical energy storage device (not shown) operatively connected to the energy harvesting assembly, such as a capacitor, a super-capacitor, an ultra-capacitor, a battery and/or other energy storage means, to provide future power to wheel end sensor 400 and its associated components and/or other electrical components of the heavy-duty vehicle, for example, when the heavy-duty vehicle is stationary and no electrical current is being generated by the energy harvesting structure. It is further contemplated that the electrical current generated by energy harvesting assembly 750 of rotary union 700 could be utilized to power other components, processes, and/or systems of the heavy-duty vehicle, such as active pneumatic control systems, powering local display, support continuous wireless streaming of data, power speed and directional monitoring of wheels, and Antilock Braking System and stability event recognition, without affecting the overall concept or operation of the disclosed subject matter. It is to be understood that other types of configurations for coils 755 and magnets 762 could be employed by rotary union 700 to generate electrical current other than that shown and described may be employed without affecting the overall concept or operation of the disclosed subject matter.

In accordance with another important aspect of first exemplary embodiment rotary union 700, energy harvesting components of energy harvesting assembly 750 are housed within and protected by housing 784 of the rotary union, and components within the wheel end assembly are protected from the energy harvesting components of the energy harvesting assembly. More specifically, and with particular reference to FIGS. 4 and 6, when housing 784 of rotary union 700 is attached to pneumatic distribution plate 604 of tire inflation system 470 in the manner described above, energy harvesting components of energy harvesting assembly 750, including stator 760, magnets 762, coil mount 752, and coils 755, as well as rectifying PC board 776, which facilitates conversion of the AC current generated by the energy harvesting assembly to DC current, are effectively encapsulated by the housing within second cavity 794. In this manner, the energy harvesting components of energy harvesting assembly 750 are protected during operation. Moreover, if one or more of the energy harvesting components of energy harvesting assembly 750 were to become defective during operation, because they are encapsulated within housing 784 of rotary union 700, there is virtually no risk that the components can damage other components within the wheel end assembly, such as other components of tire inflation system 470 and/or components within the wheel hub to which hubcap 576 is attached.

In this manner, first exemplary embodiment rotary union 700 minimizes potential damage to the energy harvesting components of energy harvesting assembly 750 during operation and/or other components of the wheel end assembly if components of the energy harvesting assembly become defective during operation. Moreover, because rotary union 700 enables the energy harvesting components of energy harvesting assembly 750 to be housed within housing 784 of the rotary union, the overall design of the rotary union, including the energy harvesting assembly, is relatively compact, thereby decreasing packaging space and overall vehicle weight, and thus decreasing the cost associated with employing energy harvesting structure in the wheel end assembly of the heavy-duty vehicle. The relatively compact energy harvesting assembly 750 of rotary union 700 is capable of powering wheel end sensor 400 and its associated components, and/or other electronic components associated with a wheel end of the heavy-duty vehicle, while minimizing torque induced on the associated wheel end assembly, and thus mounted wheel(s), by the energy harvesting structure. In addition, the energy harvesting components of energy harvesting assembly 750 of first exemplary embodiment rotary union 700 are sealed from the pressurized air path of the rotary union, thereby preventing potential damage to such components from the pressurized air.

Thus, first exemplary embodiment rotary union with energy harvesting structure 700 of the disclosed subject matter provides a functional rotary union for a tire inflation system that includes energy harvesting structure integrated into the rotary union that can energize electronic components associated with a wheel end of the heavy-duty vehicle, such as a wheel end sensor, thereby eliminating the need for disposable energy sources, such as batteries, and minimizing vehicle maintenance associated with such components, thus reducing vehicle downtime. First exemplary embodiment rotary union 700 also eliminates the need for other energy saving strategies employed with such electronic components when disposable energy sources are utilized, such as limiting functionality under certain circumstances in order to maximize battery life, thus improving the overall functionality of the components. In addition, energy harvesting structure of first exemplary embodiment rotary union 700 is housed within and protected by the rotary union, thereby minimizing potential damage to the energy harvesting structure and/or other components of the wheel end assembly, as well as decreasing packaging space and overall vehicle weight, and thus decreasing the cost associated with employing energy harvesting structures in the wheel end of the heavy-duty vehicle.

A second exemplary embodiment rotary union with energy harvesting structure of the disclosed subject matter is shown in FIGS. 9-12, and is indicated generally at reference numeral 800. Second exemplary embodiment rotary union 800 is generally similar in structure and function to first exemplary embodiment rotary union 700, except for the manner and associated structure by which it is mounted to a hubcap, the flow path of pressurized air through the second exemplary embodiment rotary union and associated structure, and the manner and associated structure by which energy harvested by the second exemplary embodiment rotary union is transferred to electronic components of the heavy-duty vehicle, as will be described in detail below. Similar to first exemplary embodiment rotary union 700, second exemplary embodiment rotary union 800 is utilized with a tire inflation system 702 and a hubcap 976 (FIGS. 11-12), which is capable of accommodating components of the tire inflation system and mounts wheel end sensor 400 (not shown with second exemplary embodiment rotary union 800—FIGS. 9-12). It is to be understood that hubcap 976 could mount wheel end sensors with structures and/or functions different than wheel end sensor 400 without affecting the overall concept or operation of the disclosed subject matter.

Figure 10:
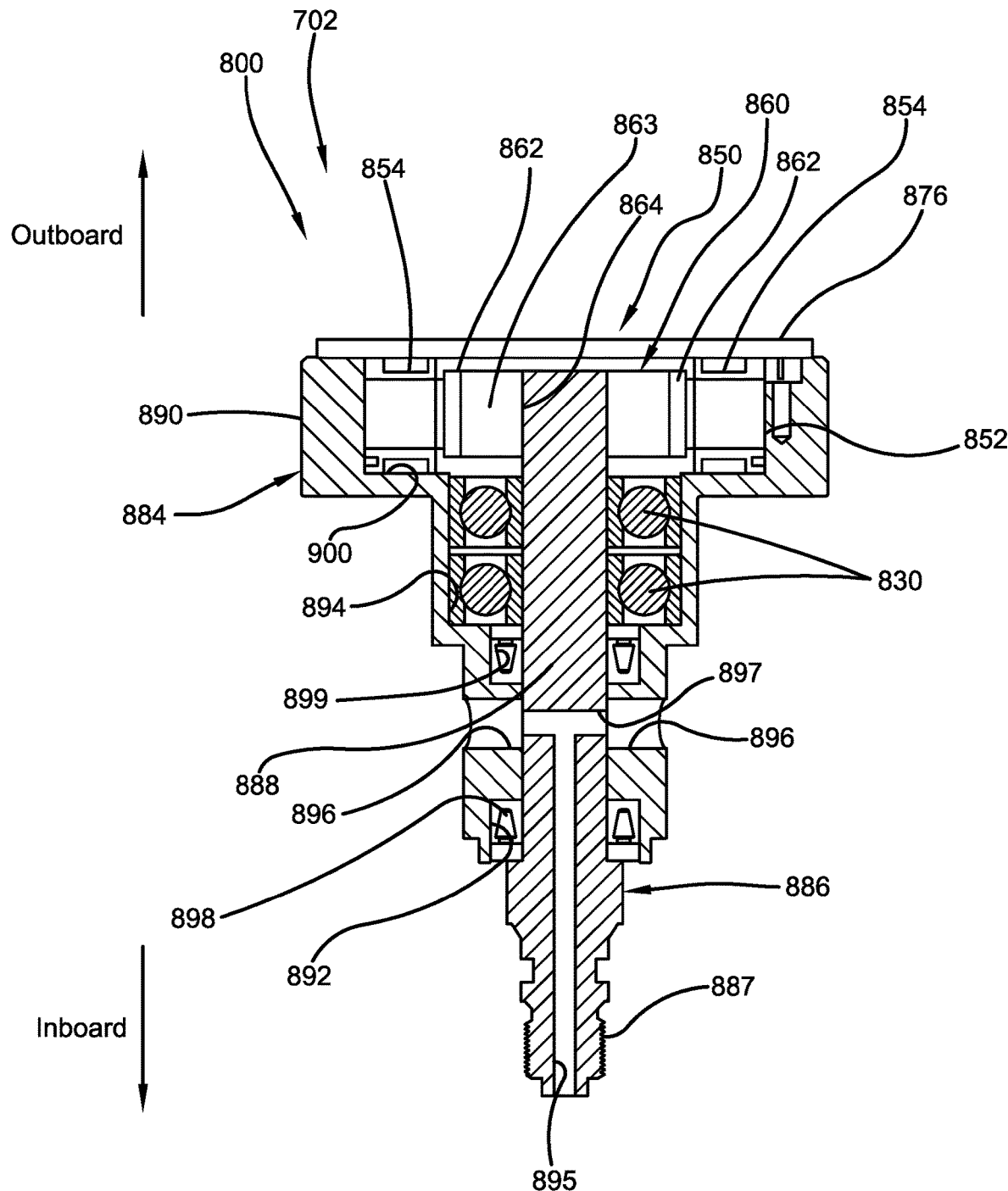
FIG. 10 is a cross-sectional view the second exemplary embodiment rotary union with integrated energy harvesting structure shown in FIG. 8.
Figure 11:
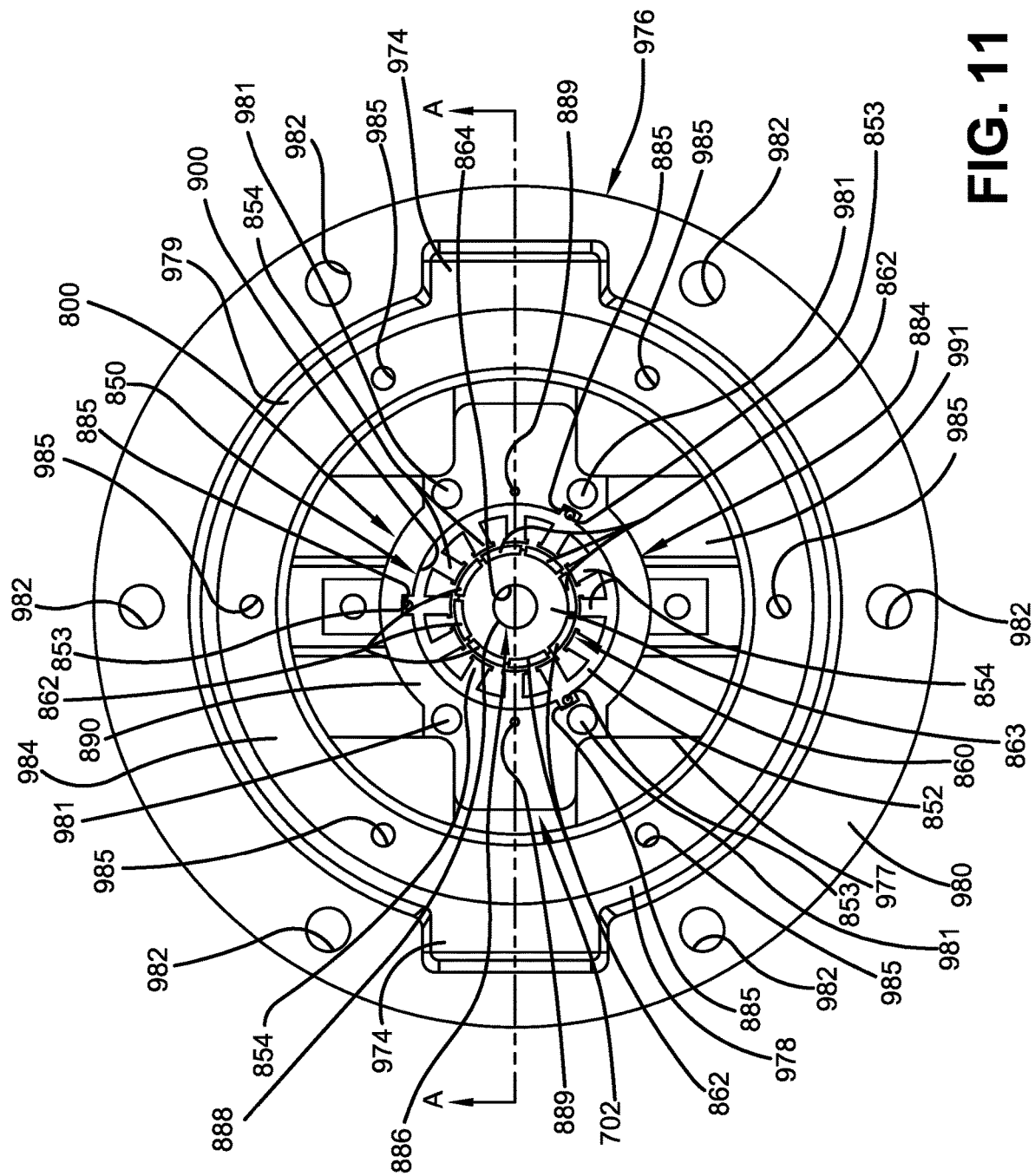
FIG. 11 is a plan view of a hubcap with the second exemplary embodiment rotary union shown in FIG. 9 mounted therein, viewed looking in an inboard direction.
Figure 12:
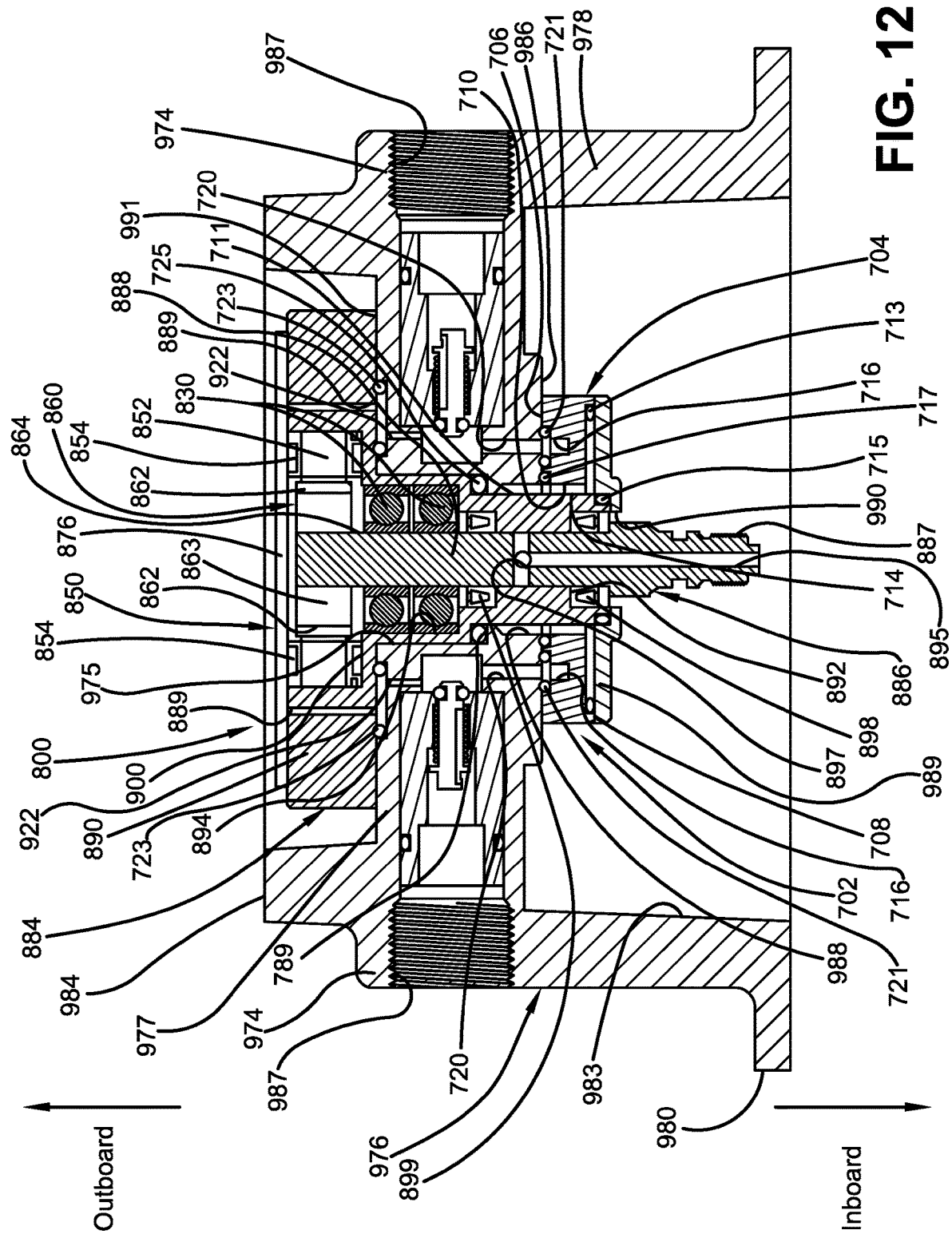
FIG. 12 is a cross-sectional view of the hubcap and second exemplary embodiment rotary union shown in FIG. 11, taken along line A-A, showing the orientation of the hubcap, second exemplary embodiment rotary union, and other components of a tire inflation system relative to each other.

With reference to FIGS. 11-12, hubcap 976 is generally similar in structure and function to hubcap 576 described above, except that the structure is modified to accommodate mounting of second exemplary embodiment rotary union 800, which will be described in detail below. Hubcap 976 generally includes a cylindrical side wall 978. Hubcap 976 also includes a frustoconical transition portion 979 (FIG. 11) extending outboardly from side wall 978. An intermediate wall 977 of hubcap 976 is integrally formed with transition portion 979 (FIG. 11) and extends between side wall 978. Intermediate wall 977 provides mounting support for components of tire inflation system 702 (FIGS. 9-12), including rotary union 800 (FIGS. 9-12), which will be described in greater detail below. Intermediate wall 977 is formed with a central opening 975 (FIG. 12), the importance of which will also be described below. It is to be understood that other shapes and configurations of hubcap 976, including side wall 978, transition portion 979 (FIG. 11), and/or intermediate wall 977 may be employed without affecting the overall concept or operation of the disclosed subject matter, such as an integrated dome or cone shape formed as one piece or multiple pieces.

Hubcap 976 includes a pair of bosses 974 that are each formed with a cylindrical bore 987 (FIG. 12). Cylindrical bores 987 (FIG. 12) are formed approximately one hundred-eighty degrees from one another and extend into intermediate wall 977, which enables optimum configuration for two tire hoses (not shown) directly connected to the cylindrical bores via respective couplings (not shown), with each hose extending to a respective one of a pair of tires of a heavy-duty vehicle dual-wheel configuration. Alternatively, a single tire hose (not shown) may be connected to one of cylindrical bores 987 (FIG. 12) via a respective coupling (not shown) and the other cylindrical bore plugged or sealed, with the single tire hose extending to and being connected to a single tire (not shown), such as a wide-based single tire, in a heavy-duty vehicle single-wheel configuration. In such heavy-duty vehicle single-wheel configurations, hubcap 976 may be formed with only a single boss 974 with a cylindrical bore 987 to which the single tire hose is connected via a coupling.

A radially-extending flange 980 is formed on the inboard end of side wall 978 of hubcap 976, and is formed with a plurality of bolt openings 982 (FIG. 11) to enable bolts (not shown) to secure hubcap 976 to the outboard end of a wheel hub (not shown) of a wheel end assembly (not shown), such as wheel hub 22 of wheel end assembly 12 (FIG. 1) described above. In this manner, hubcap 976 closes the outboard end of the wheel hub, and thus wheel end assembly, and defines an interior compartment 983 (FIG. 12). It is to be understood that means known to those skilled in the art other than bolts may be used to secure hubcap 976 to the wheel hub, such as a threaded connection between the hubcap and the wheel hub, other types of mechanical fasteners, and/or a press-fit. Hubcap 976 also includes a discrete outboard wall (not shown), such as outboard wall 590 described above, to seal the outboard end of the hubcap, and thus the wheel end assembly. Wheel end sensor 400 is mounted in hubcap 976 between an outboard end 984 of transition portion 979 (FIG. 11) and the outboard wall of the hubcap. More specifically, and with reference to FIG. 11, outboard end 984 is formed with a plurality of circumferentially spaced threaded openings 985, which are engaged by fasteners (not shown) for mounting wheel end sensor 400. The outboard wall of hubcap 976 is secured to the outboard end of wheel end sensor 400 by suitable means, such as fasteners or welding.

With reference to FIGS. 11-12, hubcap 976 incorporates and accommodates mounting of components of tire inflation system 702, including second exemplary embodiment rotary union 800. Tire inflation system 702 is similar in structure and function to tire inflation system 470, except that it includes a pneumatic distribution plate 704 (FIG. 12) with structure to accommodate rotary union 800, which will be described in detail below. Tire inflation system 702 includes a dual wheel valve assembly (not shown) that is integrated into intermediate wall 977 of hubcap 976. More specifically, the dual valve assembly includes a pair of wheel valves (not shown) similar in structure and function to wheel valves 648A and 648B described above. Each wheel valve is disposed within a respective wheel valve housing chamber (not shown) formed in intermediate wall 977 of hubcap 976. In this manner, intermediate wall 977 of hubcap 976 acts as a dual wheel valve housing for the wheel valves.

With reference to FIG. 12, tire inflation system 702 further includes pneumatic distribution plate 704. Pneumatic distribution plate 704 is generally similar in function to pneumatic distribution plate 604 described above, except that it includes structure and is configured to accommodate second exemplary embodiment rotary union 800. Pneumatic distribution plate 704 includes an outboard surface 706 that is disposed against an inboard surface 986 of intermediate wall 977. Pneumatic distribution plate 704 is attached to inboard surface 986 of intermediate wall 977 of hubcap 976 via suitable means, such as fasteners (not shown). Pneumatic distribution plate 704 includes a central opening 710, the importance of which will be described below.

Pneumatic distribution plate 704 includes a pair of pneumatic conduits 716. Each pneumatic conduit 716 is in fluid communication with a respective cylindrical bore 987 of bosses 974 of hubcap 976 via a respective ancillary pneumatic passage 720 formed in the intermediate wall. An O-ring 721 is positioned between inboard surface 986 of intermediate wall 977 of hubcap 976 and outboard surface 706 of pneumatic distribution plate 704 about each respective pneumatic conduit 716 and ancillary pneumatic passage 720 to seal between the conduit and the passage. Each pneumatic conduit 716 is also in fluid communication with a respective wheel valve housed in intermediate wall 977 of hubcap 976, which will be described in detail below.

Second exemplary embodiment rotary union 800 is employed as a component of tire inflation system 702. With reference to FIGS. 9-12, rotary union 800 includes a housing 884. Housing 884 has a generally cylindrical/stepped shaped and is formed of a suitable rigid material, such as aluminum. With reference to FIG. 12, an inboard portion of housing 884 of rotary union 800 is disposed through central opening 710 of pneumatic distribution plate 704. An annular end plate 989 is positioned against an inboard surface 708 of pneumatic distribution plate 704 and the inboard end of housing 884 of rotary union 800. End plate 989 forms a seal between pneumatic distribution plate 704 and housing 884 of rotary union 800 via an O-ring 713 positioned between the pneumatic distribution plate and the annular end plate and an O-ring 715 positioned between the inboard end of housing 884 of rotary union 800 and the annular end plate. End plate 989 includes a central opening 990, the purpose of which will be described below.

Figure 9:
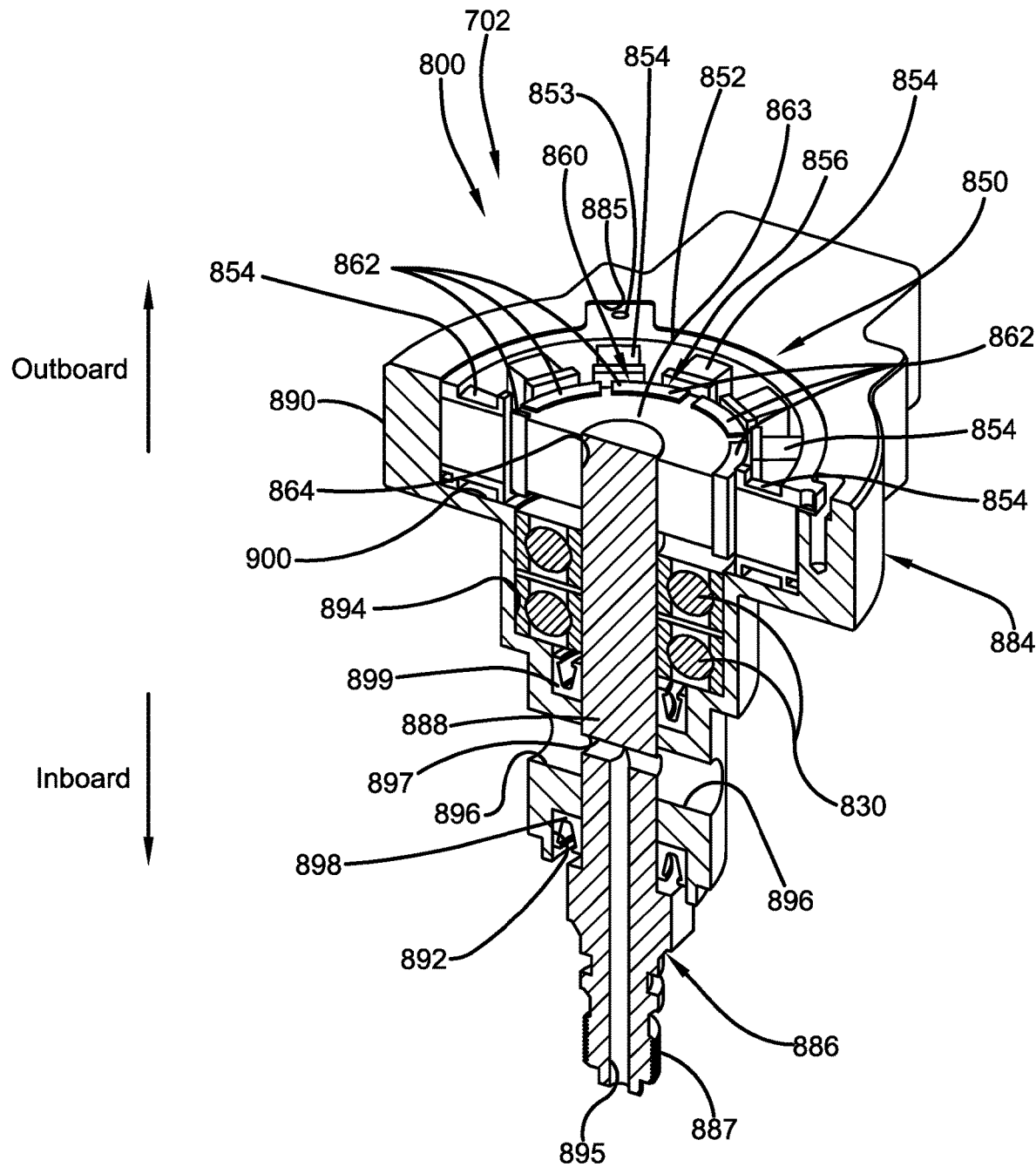
FIG. 9 is a perspective view of a second exemplary embodiment rotary union with integrated energy harvesting structure of the disclosed subject matter shown in cross-section.

With reference to FIGS. 9-10 and 12, housing 884 is formed with an inboardly facing first cavity 892 and an outboardly facing second cavity 894. First cavity 892 and second cavity 894 are separated by a pneumatic passage 896 (FIGS. 9-10) extending through housing 884. With reference to FIGS. 9-12, housing 884 further includes a mounting flange 890. Mounting flange 890 enables mounting of rotary union 800 to intermediate wall 977 of hubcap 976. More specifically, housing 884 of rotary union 800 is disposed through central opening 975 (FIG. 12) of intermediate wall 977, such that mounting flange 890 is positioned on an outboard surface 991 (FIGS. 11-12) of the intermediate wall. Mounting flange 890 is attached to intermediate wall 977 via a plurality of fasteners 981 (FIG. 11) disposed through respective openings (not shown) formed in the mounting flange that threadably engage aligned threaded openings (not shown) formed in outboard surface 991 (FIGS. 11-12) of the intermediate wall to secure rotary union 800 to hubcap 976. Mounting flange 890 also enables attachment of rotary union 800 directly to wheel end sensor 400 by any suitable means, such as fasteners (not shown).

With reference to FIGS. 9-12, second exemplary embodiment rotary union 800 includes a stem 886 with a threaded inboard portion 887 (FIGS. 9-10 and 12). With reference to FIG. 12, threaded inboard portion 887 is disposed through central opening 990 of end plate 989. Threaded inboard portion 887 engages a female hose connector (not shown) of a pneumatic conduit (not shown) connected to and in fluid communication with an air source (not shown) mounted on the heavy-duty vehicle, such as an air tank. It is to be understood that stem 886 could be connected to the pneumatic conduit by any suitable known pneumatic connection means, such as threaded or non-threaded means including threads, push-to-connect fittings, tube fittings, crimped fittings, friction fittings, hose clamps, and the like, without affecting the overall concept or operation of the disclosed subject matter. Stem 886 of rotary union 800 further includes an outboard portion 888 on which housing 884 of the rotary union is rotatably mounted, as will be described in detail below. With reference to FIGS. 9-10 and 12, stem 886 is formed with a central bore 895 that is in fluid communication with the pneumatic conduit connected to threaded inboard portion 887. Central bore 895 extends partially outboardly through outboard portion 888 of stem 886 and fluidly connects to a cross bore 897 positioned perpendicular to the central bore. Cross bore 897 is in fluid communication with pneumatic passage 896 (FIGS. 9-10) of housing 884 such that it splits the flow path from central bore 895 into two separate flow paths, with each being directed to a respective opposite side of the pneumatic passage. It is to be understood that stem 886 can include other structure, shapes, and/or configurations than that shown and described without affecting the overall concept and operation of the disclosed subject matter.

Each pneumatic passage 896 (FIGS. 9-10) is in fluid commination with a respective wheel valve housed within intermediate wall 977 of hubcap 976, which in turn is in fluid communication with a respective cylindrical bore 987 of bosses 974 of the hubcap. More specifically, and with reference to FIG. 12, an annular channel 714 is formed between housing 884 of rotary union 800 and pneumatic distribution plate 704. The inboard end of annular channel 714 is sealed from interior compartment 983 of hubcap 976 via end plate 989, O-ring 713, and O-ring 715. Annular channel 714 is in fluid communication with the wheel valves housed in intermediate wall 977 of hubcap 976 via an annular channel 711 formed between the housing and a recess 988 formed in the intermediate wall. Annular channel 714 is continuous with annular channel 711. An O-ring 717 is positioned between inboard surface 986 of intermediate wall 977 of hubcap 976 and outboard surface 706 of pneumatic distribution plate 704 about annular channels 714 and 711 to seal between the channels. The outboard end of annular channel 711 is sealed via an O-ring 725 disposed within an annular recess 789 (FIG. 12) formed in intermediate wall 977 of hubcap 976 that is positioned between housing 884 of rotary union 800 and the intermediate wall.

With reference to FIGS. 9-10 and 12, second exemplary embodiment rotary union 800 includes a first rotary seal 898 disposed within first cavity 892 of housing 884 about outboard portion 888 of stem 886 such that the first rotary seal is positioned inboard of pneumatic passage 896. Rotary union 800 includes a second rotary seal 899 disposed in second cavity 894 of housing 884 about outboard portion 888 of stem 886 such that the second rotary seal is positioned outboard of pneumatic passage 896.

To facilitate the rotatable mounting of housing 884 of second exemplary embodiment rotary union 800 about outboard portion 888 of stem 886, a pair of bearings 830 are press-fit on the stem outboard portion, and the stem outboard portion, with the bearings, is press-fit in second cavity 894 formed in the housing, such that the bearings are positioned adjacent to and outboard of second rotary seal 899. Bearings 830 thus enable housing 884 attached to hubcap 976 to rotate with the hubcap about stem 886, which remains static.

In accordance with an important aspect of the disclosed subject matter, second exemplary embodiment rotary union 800 enables operation of the rotary union for use with tire inflation system 702, as well as includes energy harvesting structures which takes advantage of the rotation of hubcap 976 and the attached rotary union to generate electricity for energizing wheel end sensor 400. More specifically, and with reference to FIGS. 9-12, rotary union 800 includes an energy harvesting assembly 850 integrated into the rotary union. Energy harvesting assembly 850 includes a coil mount 852. Coil mount 852 is generally annularly shaped and is disposed within a third cavity 900 formed in mounting flange 890 of housing 884 of rotary union 800. Coil mount 852 is attached to mounting flange 890 of housing 884 via fasteners (not shown), which are disposed through openings 853 (FIGS. 9 and 11) formed in the coil mount and threadably engage corresponding openings (not shown) formed in recesses 885 (FIGS. 9 and 11) of the mounting flange. Coil mount 852 is formed with a plurality of radial arms 854 extending radially inwardly from the coil mount, which terminate to form a generally segmented central opening 856 (FIG. 9), providing the coil mount with its generally annular shape. A coil (not shown) formed of a suitable metal material is wound around each radial arm 854, the importance of which will be described below. Each coil preferably is formed of copper or other electrical winding material known in the art.

Energy harvesting assembly 850 further includes a generally annular stator 860. Stator 860 is disposed within third cavity 900 of mounting flange 890 of housing 884 such that it is positioned within central opening 856 of coil mount 852. Stator 860 includes an annular body 863 with a central opening 864 through which outboard portion 888 of stem 886 of rotary union 800 is disposed. Stator 860 is attached to outboard portion 888 of stem 886 by any suitable means, such as welds or press-fit. Stator 860 includes a plurality of magnets 862 attached to and circumferentially spaced about the radially outward end of the stator by any suitable means, such as adhesive. Stator 860 includes eight magnets attached to and spaced circumferentially about body 863, but could include more or less magnets without affecting the overall concept or operation of the disclosed subject matter. As stator 860 is attached to outboard portion 888 of stem 886, magnets 862 are statically mounted and positioned in a precise location adjacent the radially inward ends of radial arms 854 of coil mount 852, the importance of which will be described below.

Second exemplary embodiment rotary union 800 further includes a rectifying PC board 876 (FIGS. 10 and 12). Rectifying PC board 876 is attached to the outboard surface of mounting flange 890 of housing 884 via any suitable means, such as fasteners (not shown). Rectifying PC board 876 is operatively connected to the coils of energy harvesting assembly 850 by any suitable means, such as a wire(s) (not shown). Rectifying PC board 876 is operatively connected to wheel end sensor 400 via suitable means, such as wires, the importance of which will be described below.

With reference to FIGS. 9-10 and 12, second exemplary embodiment rotary union 800 provides a flow path to route air from central bore 895 of stem 886 to other components of tire inflation system 702. More specifically, second exemplary embodiment rotary union 800 provides a sealed flow path that enables transfer of air from the air source mounted on the heavy-duty vehicle, through the pneumatic conduit, through central bore 895 of stem 886, cross bore 897, pneumatic passage 896, and into each wheel valve housed within intermediate wall 977 of hubcap 976. With reference to FIG. 12, when each wheel valve is open, air flows from each respective wheel valve through annular channel 711, annular channel 714, a respective pneumatic conduit 716 of pneumatic distribution plate 704, a respective ancillary pneumatic passage 720 formed in intermediate wall 977 of hubcap 976, a respective cylindrical bore 987 formed in the intermediate wall, and ultimately into the respective connected vehicle tire. The sealed flow path provided by second exemplary embodiment rotary union 800 ensures that energy harvesting components of the rotary union, such as coil mount 852, including the coils, and stator 860, including magnets 862, are entirely removed from the pressurized air path of the rotary union.

Exemplary embodiment rotary union 800 also provides a fluid path to route air from cylindrical bores 987 to rectifying PC board 876 (FIGS. 10 and 12) to enable wheel end sensor 400 to measure operating conditions of tire inflation system 702, such as the pressure within the tires connected to the cylindrical bores. More specifically, and with reference to FIGS. 11-12, mounting flange 890 of housing 884 of rotary union 800 is formed with a pair of pneumatic passages 889 that extend through the mounting flange. Each pneumatic passage 889 is in fluid communication with a respective auxiliary passage 922 (FIG. 12) formed in intermediate wall 977 of hubcap 976, which in turn is in fluid communication with a respective cylindrical bore 987 formed in the intermediate wall. With reference to FIG. 12, an O-ring 723 is positioned between outboard surface 991 of intermediate wall 977 of hubcap 976 and the inboard surface of mounting flange 890 of housing 884 of rotary union 800 about each respective pneumatic passage 889 and auxiliary passage 922 to seal between the pneumatic passage and the auxiliary passage. In this manner, air is capable of flowing from a respective tire, through cylindrical bore 987, auxiliary passage 922, pneumatic passage 889, and to the inboard surface of rectifying PC board 876, which in turn is capable of communicating information about operating conditions of tire inflation system 702 to wheel end sensor 400, to which it is operatively connected.

In addition, second exemplary embodiment rotary union 800 also is capable of generating electricity for energizing wheel end sensor 400 mounted on hubcap 976 during operation of the heavy-duty vehicle. More specifically, during operation of the heavy-duty vehicle, as hubcap 976 rotates, because housing 884 of rotary union 800 is attached to intermediate wall 977 of hubcap 976, the housing also rotates. Consequently, coil mount 852, which is attached to housing 884 of rotary union 800, and thus the coils of radial arms 854 of the coil mount, rotate about magnets 862 attached to stator 860, which remain static with stem 886 of rotary union 800. As the coils rotate about magnets 862, the close proximity of the coils and the magnets enables an AC current to be produced in the coils. As rectifying PC board 876 is in close proximity and operatively connected to the coils, the AC current generated by energy harvesting assembly 850 is transmitted to the PC board, which in turn facilitates conversion of the AC current to DC current via one or more circuits (not shown) of the PC board. The DC current in turn is transferred from rectifying PC board 876 directly to wheel end sensor 400 and the DC current generated by energy harvesting assembly 850 of rotary union 800 can be utilized to directly power the wheel end sensor and associated components.

In this manner, energy harvesting assembly 850 of second exemplary embodiment rotary union 800 is capable of generating electrical current to power wheel end sensor 400 and its associated components, thereby eliminating the need for disposable power sources, such as batteries, to power the wheel end sensor and its associated components. Moreover, as energy harvesting assembly 850 of second exemplary embodiment rotary union 800 is capable of generating electrical current to power wheel end sensor 400 and its associated components, the rotary union eliminates the need to employ energy saving strategies with wheel end sensor 400 to conserve energy, such as limiting functionality under certain circumstances in order to maximize battery life when batteries are employed by a wheel end sensor, thus improving the overall functionality of the wheel end sensor and associated components.

It is contemplated that the electrical current generated by energy harvesting assembly 850 of rotary union 800 could also be stored via an electrical energy storage device (not shown) operatively connected to the energy harvesting assembly, such as a capacitor, a super-capacitor, an ultra-capacitor, a battery and/or other energy storage means to provide future power to wheel end sensor 400 and its associated components and/or other components of the heavy-duty vehicle, for example, when the heavy-duty vehicle is stationary and no electrical current is being generated by the energy harvesting structure. It is further contemplated that the electrical current generated energy harvesting assembly 850 of rotary union 800 could be utilized to power other components, processes, and/or systems of the heavy-duty vehicle, such as active pneumatic control systems, powering local display, support continuous wireless streaming of data, power speed and directional monitoring of wheels, and Antilock Braking System and stability event recognition, without affecting the overall concept or operation of the disclosed subject matter. It is to be understood that other types of configurations for the coils and magnets 862 other than that shown and described may be employed by rotary union 800 without affecting the overall concept or operation of the disclosed subject matter. It is to be further understood that while rectifying PC board 876 is shown attached to the outboard surface of mounting flange 890 of housing 884 of rotary union 800 so that energy harvesting structure of energy harvesting assembly 850 is fully encapsulated, it is contemplated that the rectifying PC board could be located remotely from rotary union 800, such as integrated directly into a wheel end sensor and operatively connected to energy harvesting assembly 850 via one or more wires, without affecting the overall concept or operation of the disclosed subject matter.

In accordance with another important aspect of second exemplary embodiment rotary union 800, energy harvesting components of energy harvesting assembly 850 are housed within and protected by housing 884 of the rotary union. More specifically, when housing 884 of rotary union 800 is attached to intermediate wall 977 of hubcap 976, energy harvesting components of energy harvesting assembly 850, including stator 860, magnets 862, coil mount 852, and the coils, are effectively encapsulated by the housing within third cavity 900 of mounting flange 890. In this manner, the energy harvesting components of energy harvesting assembly 850 are protected during operation. Moreover, if one or more of the energy harvesting components of energy harvesting assembly 850 were to become defective during operation, because they are encapsulated within housing 884 of rotary union 800, there is virtually no risk that the components can damage other components within the wheel end assembly, such as other components of tire inflation system 702 and/or components within the wheel hub to which hubcap 976 is attached.

In this manner, second exemplary embodiment rotary union 800 minimizes potential damage to the harvesting components of energy harvesting assembly 850 during operation and/or other components of the wheel end assembly if components of energy harvesting assembly 850 become defective during operation. Moreover, because rotary union 800 enables the energy harvesting components of energy harvesting assembly 850 to be housed within housing 884 of the rotary union, the overall design of the rotary union, including the energy harvesting assembly, is relatively compact, thereby decreasing packaging space and overall vehicle weight, and thus decreasing the cost associated with employing energy harvesting structure in the wheel end of the heavy-duty vehicle. The relatively compact energy harvesting assembly 850 of rotary union 800 is capable of powering wheel end sensor 400 and its associated components, and/or other electronic components associated with a wheel end of the heavy-duty vehicle, while minimizing torque induced on the associated wheel end assembly, and thus mounted wheel(s), by the energy harvesting structure Thus, second exemplary embodiment rotary union with energy harvesting structure 800 of the disclosed subject matter provides a functional rotary union for a tire inflation system that includes energy harvesting structure integrated into the rotary union that can energize electronic components associated with a wheel end of the heavy-duty vehicle, such as a wheel end sensor, thereby eliminating the need for disposable energy sources, such as batteries, and minimizing vehicle maintenance associated with such components, thus reducing vehicle downtime. Second exemplary embodiment rotary union 800 also eliminates the need for other energy saving strategies employed with such electronic components when disposable energy sources are utilized, such as limiting functionality under certain circumstances in order to maximize battery life, thus improving the overall functionality of the components. In addition, energy harvesting structure of second exemplary embodiment rotary union 800 is housed within and protected by the rotary union, thereby minimizing potential damage to the energy harvesting structure and/or other components of the wheel end assembly, as well as decreasing packaging space and overall vehicle weight, and thus decreasing the cost associated with employing energy harvesting structures in the wheel end of the heavy-duty vehicle.

It is to be understood that the rotary union with energy harvesting structure of the disclosed subject matter finds application in all types of tire inflation systems, hubcaps, heavy-duty axle spindles, wheel end assemblies, and vehicles known to those skilled in the art, including other types of tire inflation systems, hubcaps, wheel end assemblies, and vehicles than those shown and described herein and known to those skilled in the art, without affecting the concept or operation of the disclosed subject matter. It is also to be understood that other shapes and configurations for the rotary union with energy harvesting structure of the disclosed subject matter other than those shown and described above may be employed without affecting the overall concept or operation of the disclosed subject matter. In addition, while components of the energy harvesting structure of the disclosed rotary union are shown and described as being removed from the pressurized flow path within the rotary union, it is contemplated that some or all of such components could be within the pressurized flow path without affecting the overall concept or operation of the disclosed subject matter.

Accordingly, the rotary union with energy harvesting structure of the disclosed subject matter is simplified; provides an effective, safe, inexpensive, and efficient structure which achieves all the enumerated objectives; provides for eliminating difficulties encountered with the prior art; and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the disclosed subject matter is by way of example, and the scope of the disclosed subject matter is not limited to the exact details shown or described.

Having now described the features, discoveries and principles of the disclosed subject matter; the manner in which the rotary union with energy harvesting structure of the disclosed subject matter is used and installed; the characteristics of the construction and arrangement; and the advantageous, new and useful results obtained; the new and useful structures, devices, elements, arrangements, parts and combinations are set forth in the appended claims.

What is claimed is:

1. A rotary union for a tire inflation system of a heavy-duty vehicle comprising:
a static portion, said static portion remaining static during operation of said heavy-duty vehicle;
a rotatable portion, the rotatable portion rotating with one or more rotating components of a wheel end of the heavy-duty vehicle during operation, at least one of the static portion and said rotatable portion being mounted to a component associated with said wheel end, at least one of said static portion and the rotatable portion being in fluid communication with an air source located on said heavy-duty vehicle remote from the wheel end, said rotary union being in fluid communication with at least one wheel of said wheel end and allowing pressurized air from said air source to flow to said at least one wheel;
energy harvesting structure integrated with said rotary union, said energy harvesting structure generating electricity during operation of the heavy-duty vehicle for energizing one or more electronic components of said heavy-duty vehicle; and
wherein the energy harvesting structure is disposed within a housing of said rotary union, said housing being discrete from a hub cap, an axle spindle of an axle, and a wheel hub of the heavy-duty vehicle.

2. The rotary union for a tire inflation system of a heavy-duty vehicle of claim 1, wherein said energy harvesting structure is protected by said rotary union.

3. The rotary union for a tire inflation system of a heavy-duty vehicle of claim 1, wherein said energy harvesting structure is entirely removed and sealed from a flow path of said pressurized air through said rotary union.

4. The rotary union for a tire inflation system of a heavy-duty vehicle of claim 1, wherein at least one component of said energy harvesting structure is attached to said static portion and at least one component of the energy harvesting structure is attached to said rotatable portion, wherein rotation of the rotatable portion relative to the static portion generates electricity to energize said one or more electronic components.

5. The rotary union for a tire inflation system of a heavy-duty vehicle of claim 4, said rotary union further including a rectifying PC board, wherein said electricity generated by rotation of said rotatable portion relative to said static portion during operation of the heavy-duty vehicle is AC current, said rectifying PC board converting said AC current to DC current for energizing said one or more electronic components of said heavy-duty vehicle.

6. The rotary union for a tire inflation system of a heavy-duty vehicle of claim 5, said energy harvesting structure further including a power routing assembly, said power routing assembly being operatively connected to said rectifying PC board and directly connected to said one or more electronic components of said heavy-duty vehicle, the power routing assembly transferring said DC current to the one or more electronic components.

7. The rotary union for a tire inflation system of a heavy-duty vehicle of claim 6, wherein said at least one or more electronic components includes a wheel end sensor.

8. The rotary union for a tire inflation system of a heavy-duty vehicle of claim 5, wherein said rectifying PC board is directly operatively connected to and directly transfers said DC current to said one or more electronic components of said heavy-duty vehicle.

9. The rotary union for a tire inflation system of a heavy-duty vehicle of claim 1, wherein electricity generated by said energy harvesting structure directly energizes said one or more electronic components during operation of said heavy-duty vehicle.

10. The rotary union for a tire inflation system of a heavy-duty vehicle of claim 9, wherein said one or more electronic components includes a wheel end sensor.

11. The rotary union for a tire inflation system of a heavy-duty vehicle of claim 1, wherein electricity generated by said energy harvesting structure is stored via an electrical energy storage device operatively connected to the energy harvesting structure.

12. The rotary union for a tire inflation system of a heavy-duty vehicle of claim 11, wherein said electrical energy storage device is a capacitor, a super-capacitor, an ultra-capacitor, or a battery.

13. The rotary union for a tire inflation system of a heavy-duty vehicle of claim 1, wherein said rotatable portion is a said housing and said static portion is a stem, the housing being rotatably mounted on said stem, the stem being in fluid communication with said air source and providing a flow path for said pressurized air through said rotary union.

14. The rotary union for a tire inflation system of a heavy-duty vehicle of claim 13, wherein said housing is connected to a hubcap of a wheel end assembly of said heavy-duty vehicle, said energy harvesting structure being encapsulated by the housing.

15. The rotary union for a tire inflation system of a heavy-duty vehicle of claim 14, wherein said housing is connected to an intermediate wall of said hubcap.

16. The rotary union for a tire inflation system of a heavy-duty vehicle of claim 13, wherein said housing is connected to a pneumatic distribution plate of said tire inflation system, said energy harvesting structure being encapsulated by the housing.

17. The rotary union for a tire inflation system of a heavy-duty vehicle of claim 13, wherein said housing is rotatably mounted on said stem via one or more bearings.

18. The rotary union for a tire inflation system of a heavy-duty vehicle of claim 13, said energy harvesting structure further comprising:
   a stator, said stator being positioned about and attached to said stem, the stator including at least one magnet attached circumferentially about said stator; and
   a coil mount, said coil mount being attached to and disposed within said housing, the coil mount including at least one coil formed of an electrical winding material wound around said coil mount, the stem being disposed through the coil mount such that said at least one magnet is positioned radially inward and adjacent said at least one coil, whereby rotation of the at least one coil about the at least one magnet during operation of said heavy-duty vehicle generates said electricity.

19. The rotary union for a tire inflation system of a heavy-duty vehicle of claim 18, wherein said stator includes eight magnets attached circumferentially about the stator.

20. The rotary union for a tire inflation system of a heavy-duty vehicle of claim 18, wherein said coil mount includes a plurality of radial arms, each one of said plurality of radial arms including a respective coil wound around the radial arm, said at least one magnet being positioned radially inward and adjacent radially inward ends of said radial arms.

21. The rotary union for a tire inflation system of a heavy-duty vehicle of claim 1, wherein said static portion is secured to said axle spindle.

22. The rotary union for a tire inflation system of a heavy-duty vehicle of claim 1, wherein said rotatable portion is connected to said hub cap or a pneumatic distribution plate of said tire inflation system.

23. A rotary union for a tire inflation system of a heavy-duty vehicle comprising:
   a static portion, said static portion remaining static during operation of said heavy-duty vehicle;
   a rotatable portion, the rotatable portion rotating with one or more rotating components of a wheel end of the heavy-duty vehicle during operation, at least one of the static portion and said rotatable portion being mounted to a component associated with said wheel end, at least one of said static portion and the rotatable portion being in fluid communication with an air source located on said heavy-duty vehicle, said rotary union being in fluid communication with at least one wheel of the wheel end and allowing pressurized air from said air source to flow to said at least one wheel;
   energy harvesting structure integrated with said rotary union, said energy harvesting structure generating electricity during operation of the heavy-duty vehicle for energizing one or more electronic components of said heavy-duty vehicle;
   wherein said rotatable portion is a housing and the static portion is a stem, said housing being rotatably mounted on said stem, the stem being in fluid communication with said air source and providing a flow path for said pressurized air through the rotary union; and
   wherein the housing is connected to a hubcap of a wheel end assembly of said heavy-duty vehicle, the energy harvesting structure being encapsulated by said housing.

24. A rotary union for a tire inflation system of a heavy-duty vehicle comprising:
   a static portion, said static portion remaining static during operation of said heavy-duty vehicle;
   a rotatable portion, the rotatable portion rotating with one or more rotating components of a wheel end of the heavy-duty vehicle during operation, at least one of the static portion and said rotatable portion being mounted to a component associated with said wheel end, at least one of said static portion and the rotatable portion being in fluid communication with an air source located on said heavy-duty vehicle, said rotary union being in fluid communication with at least one wheel of the wheel end and allowing pressurized air from said air source to flow to said at least one wheel;
   wherein said rotatable portion is a housing and the static portion is a stem, said housing being rotatably mounted on said stem, the stem being in fluid communication with said air source and providing a flow path for said pressurized air through said rotary union; and
   energy harvesting structure integrated with the rotary union, said energy harvesting structure generating electricity during operation of the heavy-duty vehicle for energizing one or more electronic components of said heavy-duty vehicle, the energy harvesting structure comprising:
      a stator, said stator being positioned about and attached to said stem, the stator including at least one magnet attached circumferentially about said stator;
      a coil mount, said coil mount being attached to and disposed within the housing, the coil mount including at least one coil formed of an electrical winding material wound around said coil mount, the stem being disposed through the coil mount such that said at least one magnet is positioned radially inward and adjacent said at least one coil, whereby rotation of the at least one coil about the at least one magnet during operation of the heavy-duty vehicle generates said electricity; and
      wherein said coil mount includes a plurality of radial arms, each one of said plurality of radial arms including a respective coil wound around the radial arm, said at least one magnet being positioned radially inward and adjacent radially inward ends of said radial arms.

\* \* \* \* \*